(12) United States Patent
Savenok

(10) Patent No.: US 10,882,667 B2
(45) Date of Patent: Jan. 5, 2021

(54) LIQUID CONTAINER LID ASSEMBLY AND METHOD

(71) Applicant: Pavel Savenok, Wheaton, IL (US)

(72) Inventor: Pavel Savenok, Wheaton, IL (US)

( * ) Notice: Subject to any disclaimer, the term of this patent is extended or adjusted under 35 U.S.C. 154(b) by 109 days.

(21) Appl. No.: 16/220,089

(22) Filed: Dec. 14, 2018

(65) Prior Publication Data
US 2019/0183270 A1 Jun. 20, 2019

Related U.S. Application Data

(60) Provisional application No. 62/599,585, filed on Dec. 15, 2017.

(51) Int. Cl.
| | |
|---|---|
| *B65D 47/06* | (2006.01) |
| *B65D 47/26* | (2006.01) |
| *B65D 51/28* | (2006.01) |
| *B65D 85/80* | (2006.01) |
| *A47J 31/00* | (2006.01) |
| *A47G 19/22* | (2006.01) |
| *B65D 47/28* | (2006.01) |

(Continued)

(52) U.S. Cl.
CPC ......... *B65D 47/06* (2013.01); *A47G 19/2272* (2013.01); *A47J 31/00* (2013.01); *B65D 47/263* (2013.01); *B65D 47/286* (2013.01); *B65D 51/2807* (2013.01); *B65D 85/8043* (2013.01); *B65D 51/18* (2013.01); *B65D 2543/00046* (2013.01); *B65D 2543/00092* (2013.01)

(58) Field of Classification Search
CPC .... B65D 47/061; B65D 47/06; B65D 47/286; B65D 47/28; B65D 47/263; B65D 47/261; B65D 47/26; B65D 51/2807; B65D 51/28; B65D 51/18; B65D 85/8043; B65D 85/804; A47J 31/00; A47G 19/2272
USPC ......... 220/254.8, 254.3, 254.1, 259.4, 259.3, 220/256.1, 713, 711
See application file for complete search history.

(56) References Cited

U.S. PATENT DOCUMENTS

| | | | | |
|---|---|---|---|---|
| 5,873,493 A | * | 2/1999 | Robinson | G01F 11/262 222/109 |
| 6,176,390 B1 | * | 1/2001 | Kemp | B65D 43/0212 220/711 |

(Continued)

*Primary Examiner* — Robert J Hicks
(74) *Attorney, Agent, or Firm* — Christopher J. Scott

(57) ABSTRACT

A lid assembly includes a lid body and a lid body insert. The lid body includes an insert-receiving depression and a channel-guiding protuberance. The channel-guiding protuberance is formed at an upper depression surface of the insert-receiving depression. The insert-receiving depression is outfitted with a primary liquid outlet for enabling liquid egression therethrough. The lid body insert is receivable in the insert-receiving depression and includes a protuberance-receiving channel and a secondary liquid outlet. The protuberance-receiving channel receives the channel-guiding protuberance when the lid body insert is received in the insert-receiving depression. The lid body insert is rotatable intermediate first and second closed lid positions. The secondary liquid outlet is positionable in superior adjacency to the primary liquid outlet when in an open lid position for enabling liquid egression via both the primary and secondary liquid outlets. A lid assembly system and associated methodology is further contemplated.

20 Claims, 33 Drawing Sheets

(51) Int. Cl.
*B65D 85/804* (2006.01)
*B65D 51/18* (2006.01)

(56) References Cited

U.S. PATENT DOCUMENTS

| | | | | |
|---|---|---|---|---|
| 6,216,903 | B1* | 4/2001 | Hirose | A47G 19/2272 220/253 |
| 6,488,173 | B2* | 12/2002 | Milan | A47G 19/2272 215/387 |
| 7,448,510 | B2* | 11/2008 | Pavlopoulos | A47G 19/34 220/501 |
| 7,607,549 | B2* | 10/2009 | Morini | B65D 41/3438 215/297 |
| 2003/0209547 | A1* | 11/2003 | Lin | A47G 19/2272 220/254.8 |
| 2007/0062943 | A1* | 3/2007 | Bosworth, Sr. | B65D 43/0208 220/212 |
| 2010/0264150 | A1* | 10/2010 | Leon | A47G 19/2261 220/669 |
| 2010/0320220 | A1* | 12/2010 | Hussey | B65D 47/286 220/796 |
| 2018/0078018 | A1* | 3/2018 | Lee | B65D 83/00 |
| 2018/0079567 | A1* | 3/2018 | Engel | B65D 51/28 |
| 2018/0127161 | A1* | 5/2018 | Smith | B65D 51/18 |

* cited by examiner

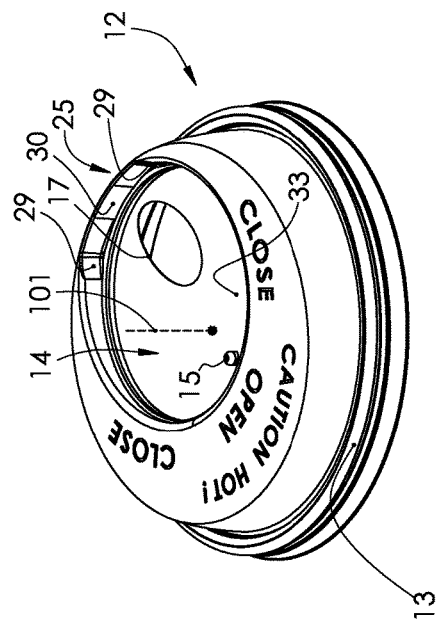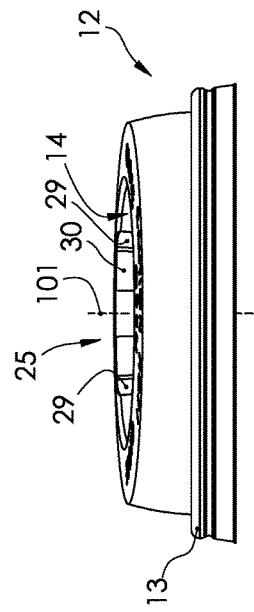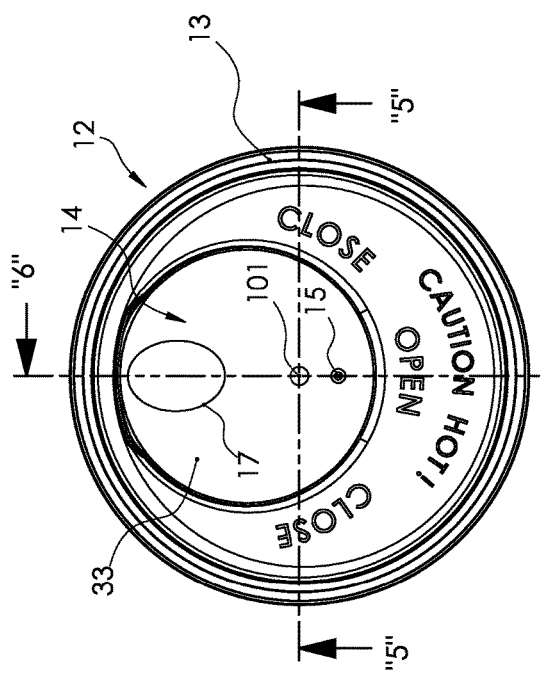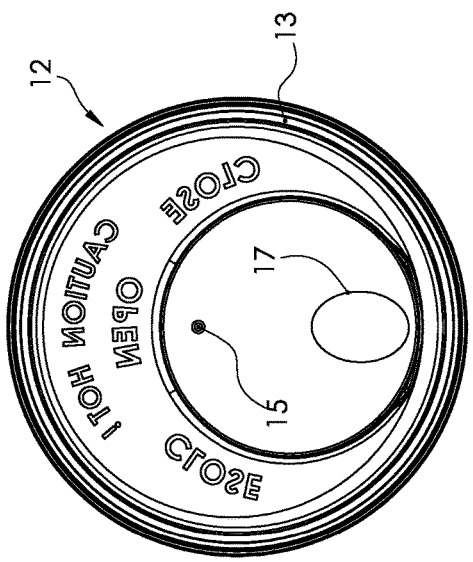

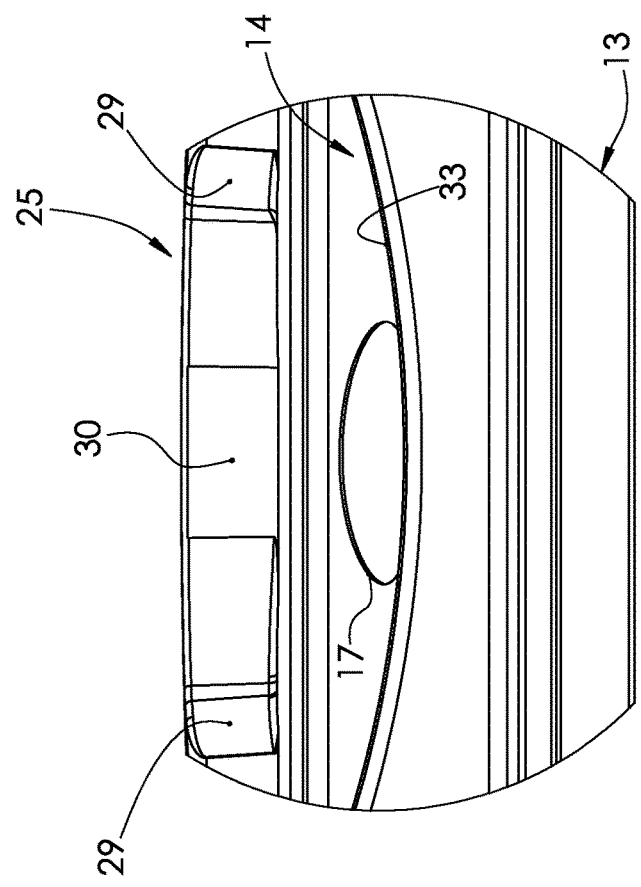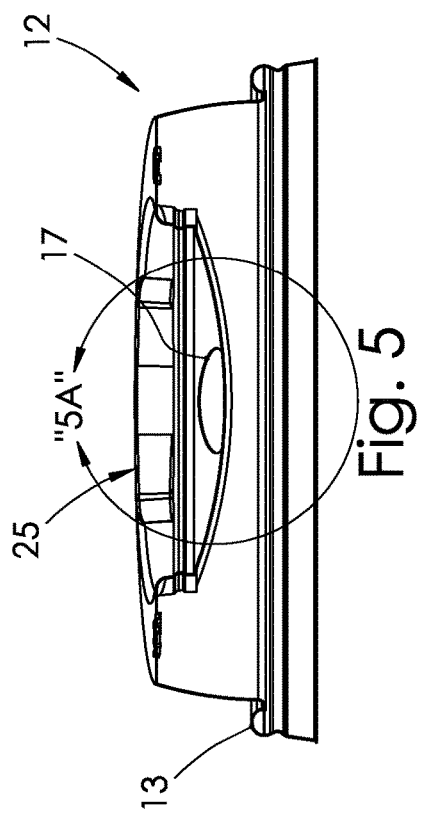

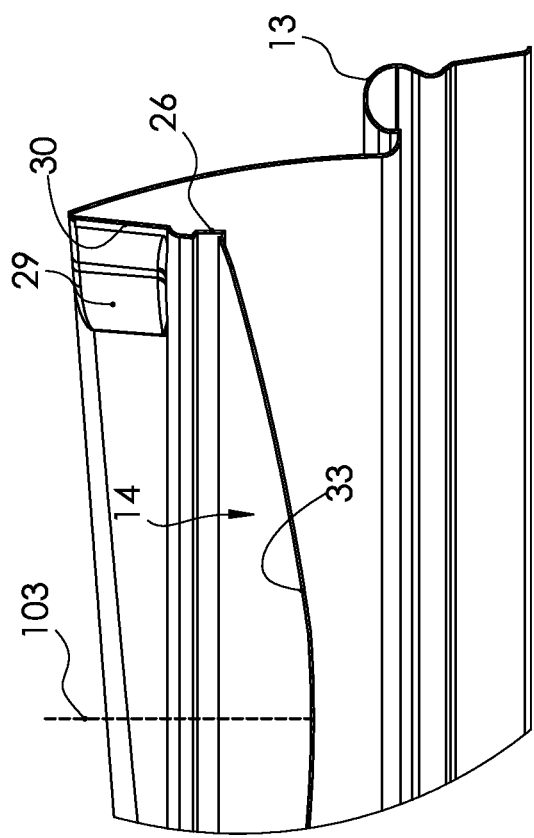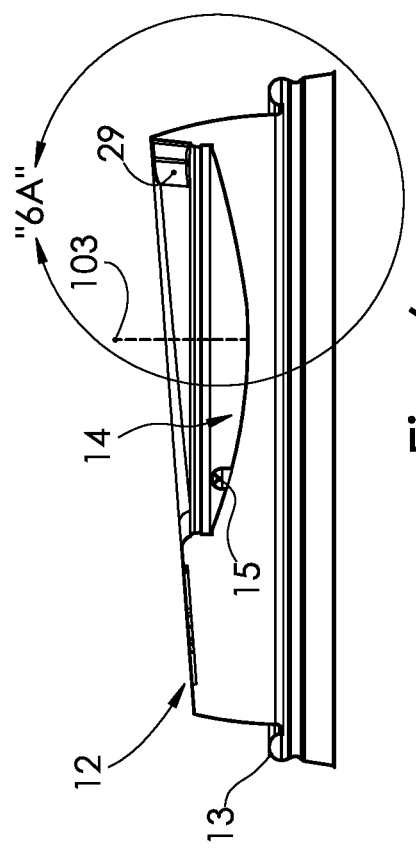

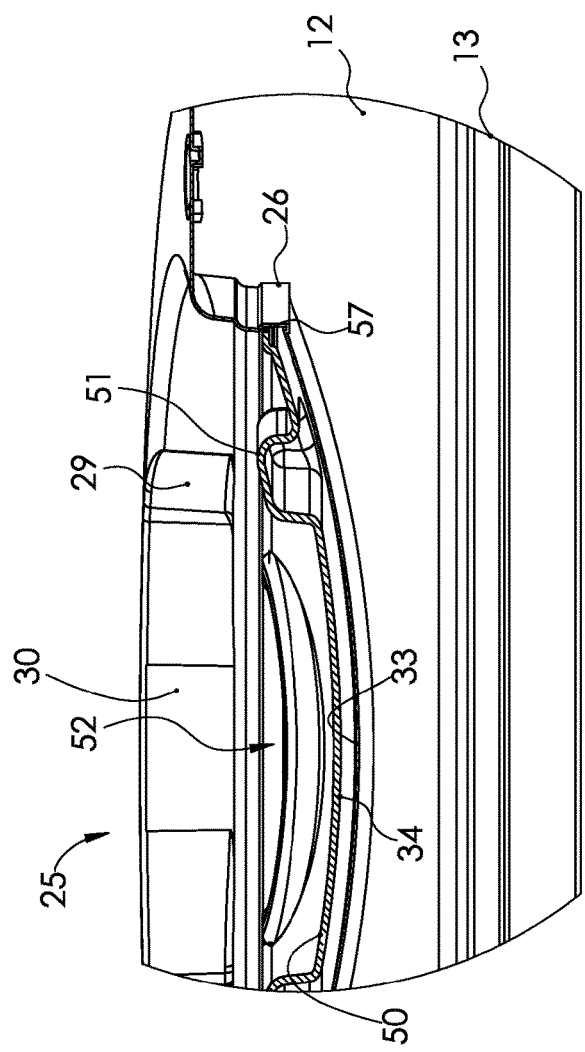
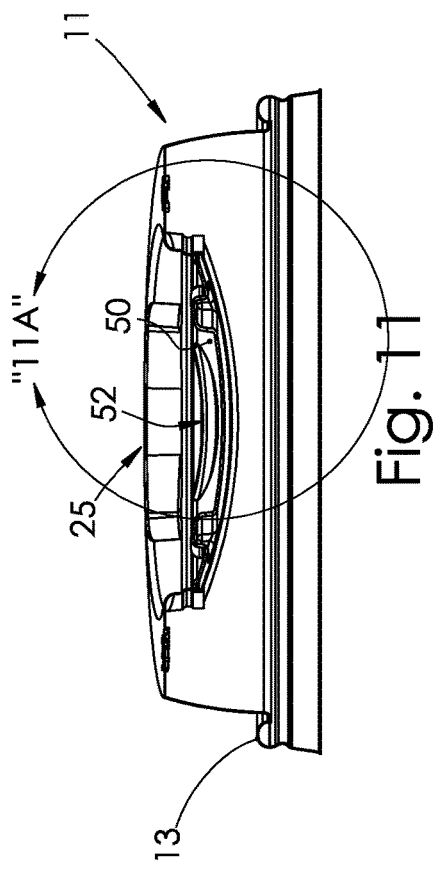
Fig. 11A
Fig. 11

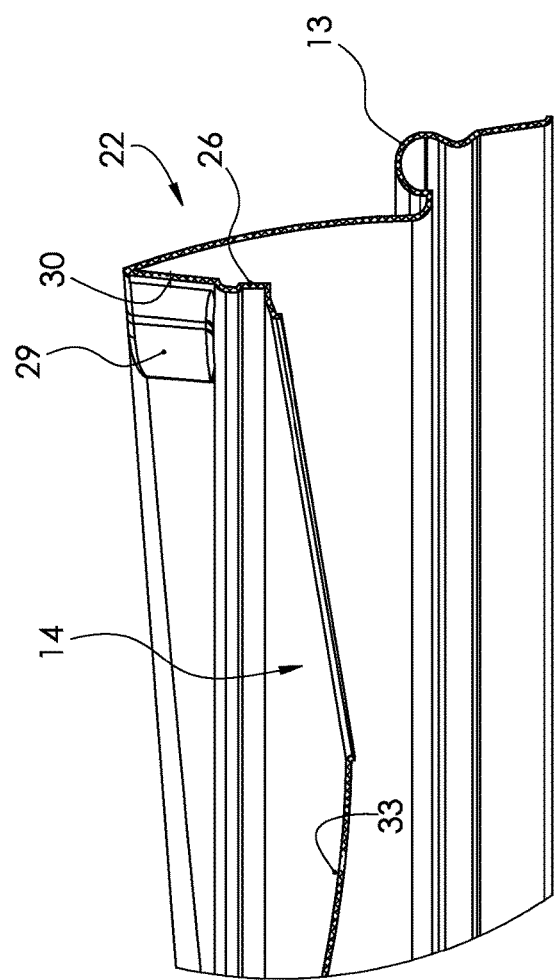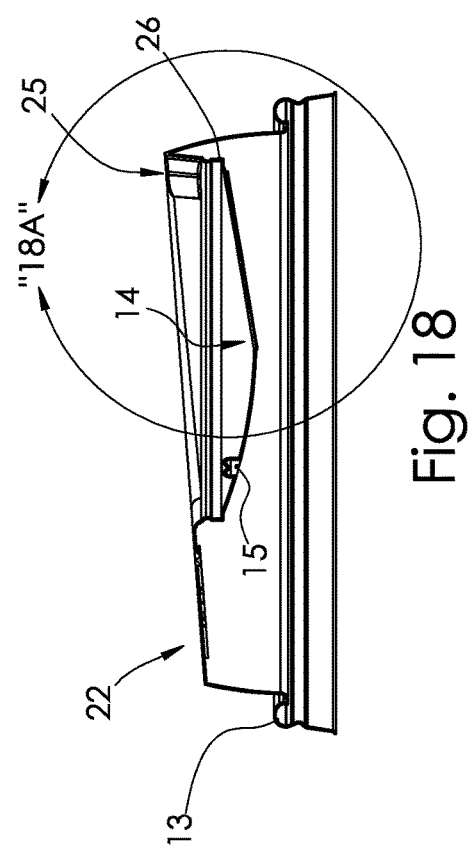

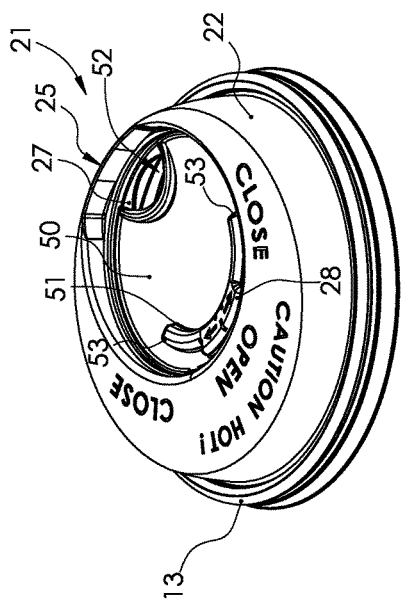
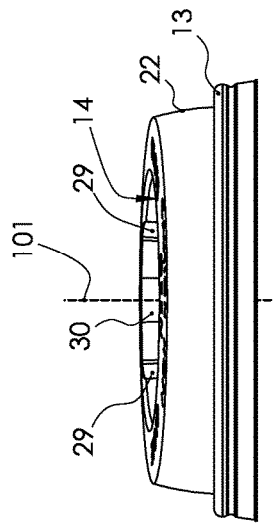
Fig. 19
Fig. 22
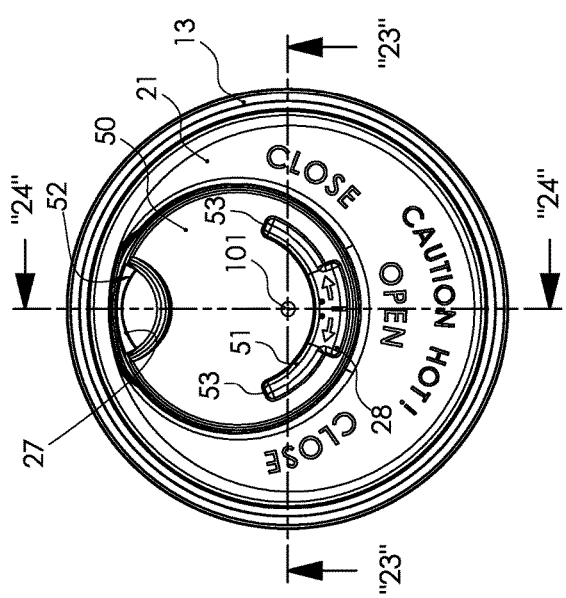
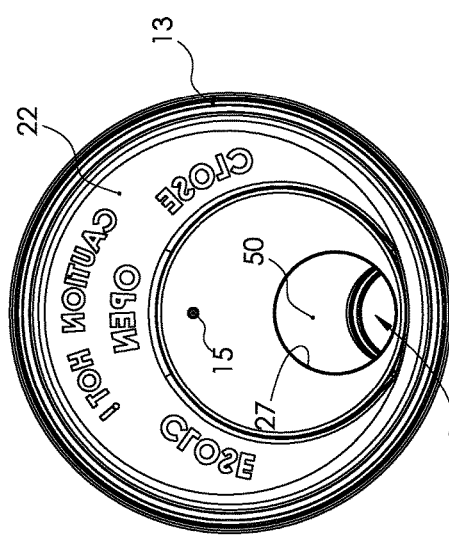
Fig. 20
Fig. 21

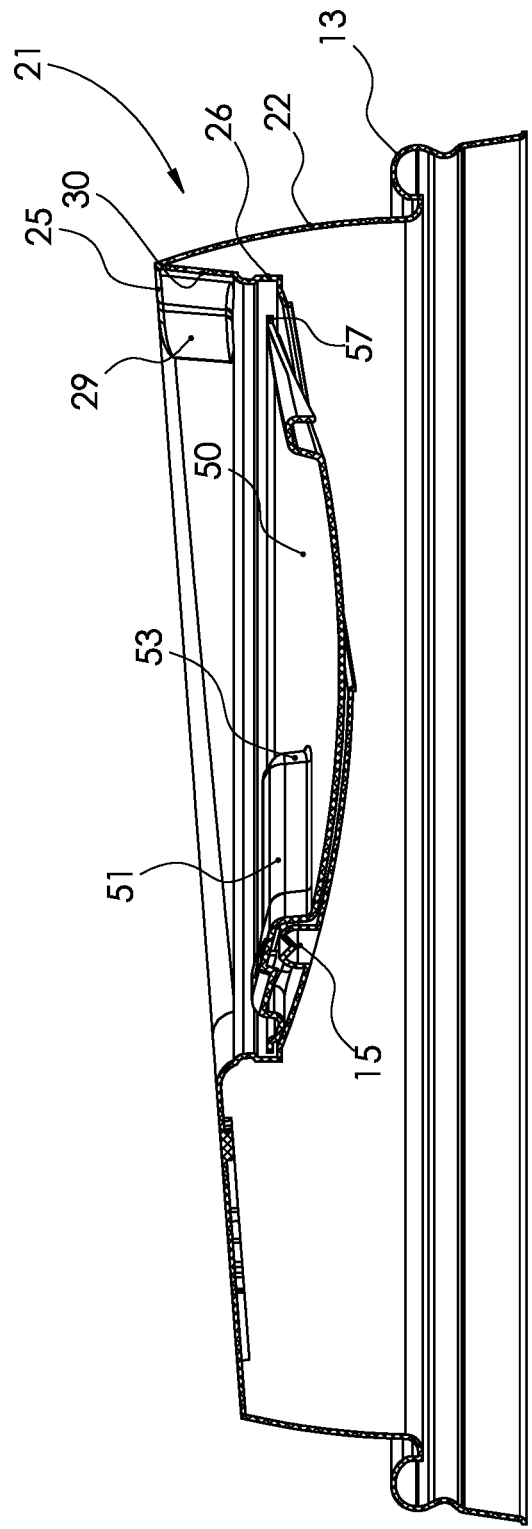

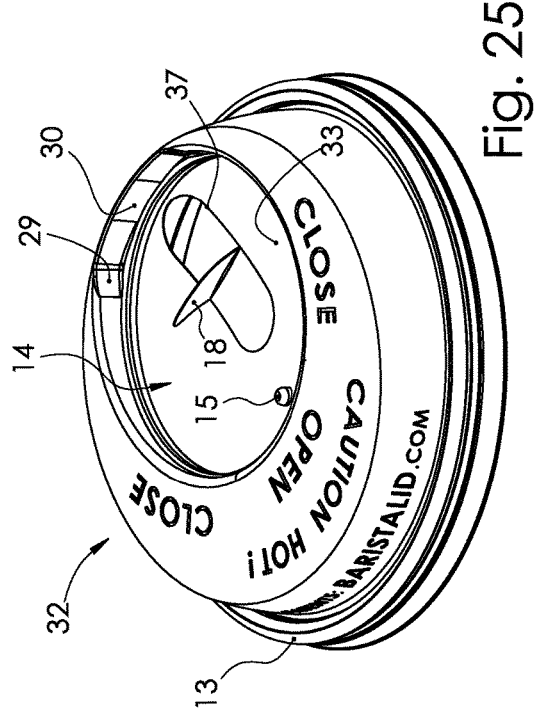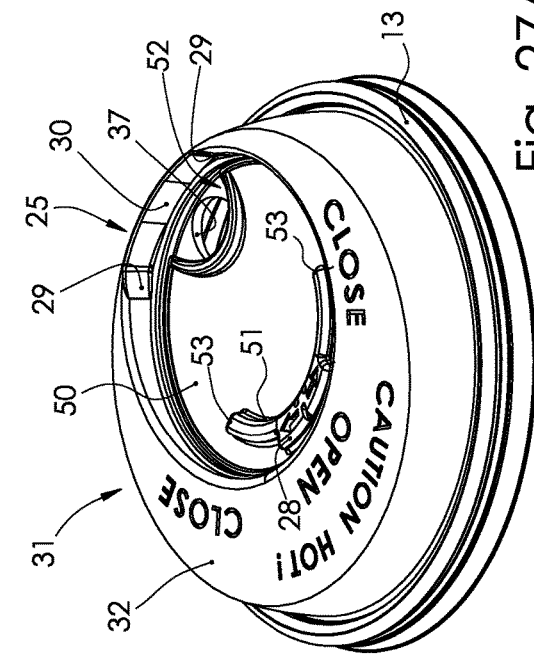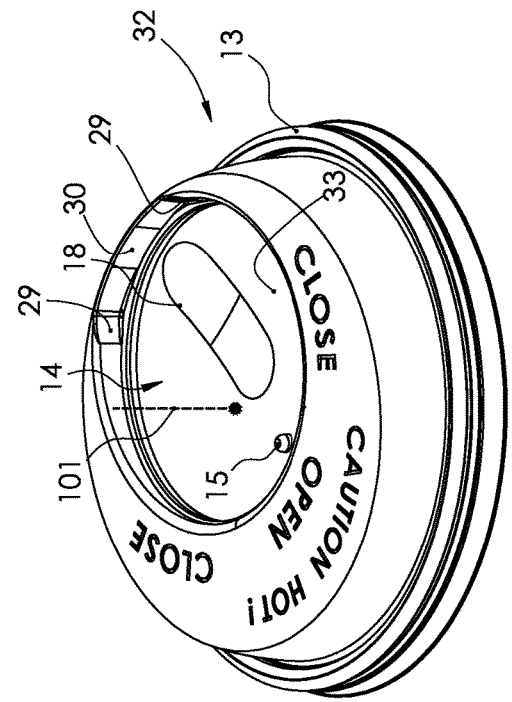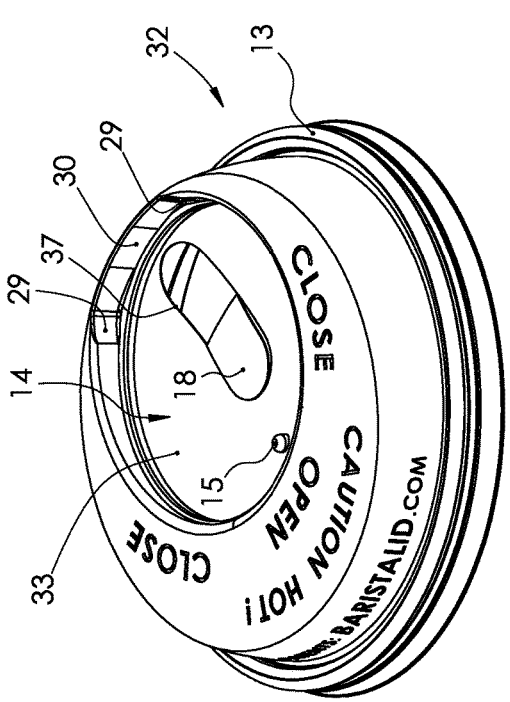

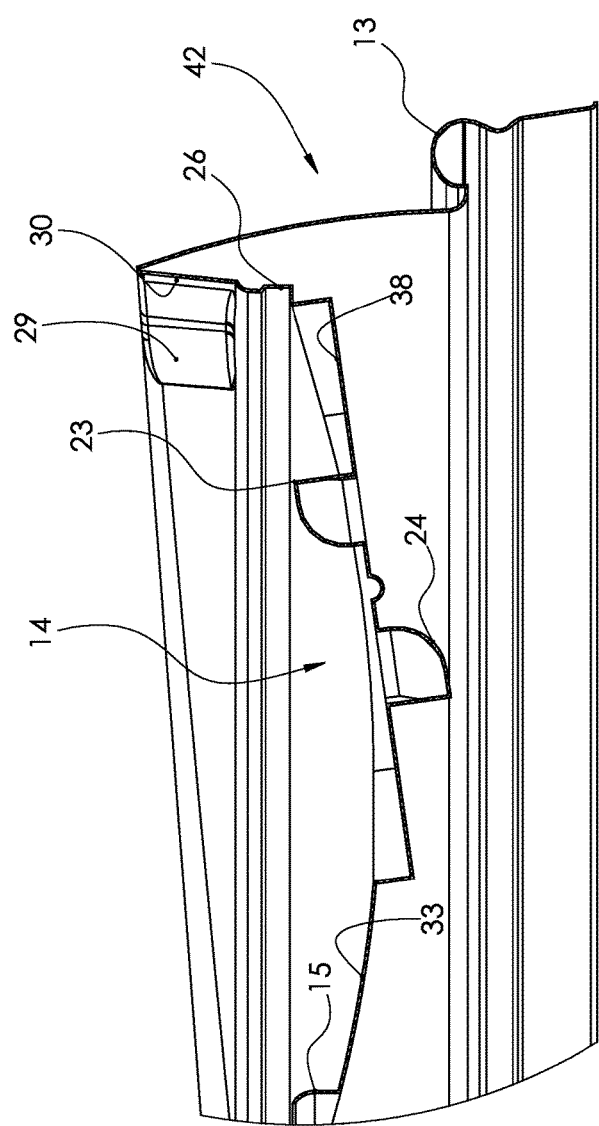
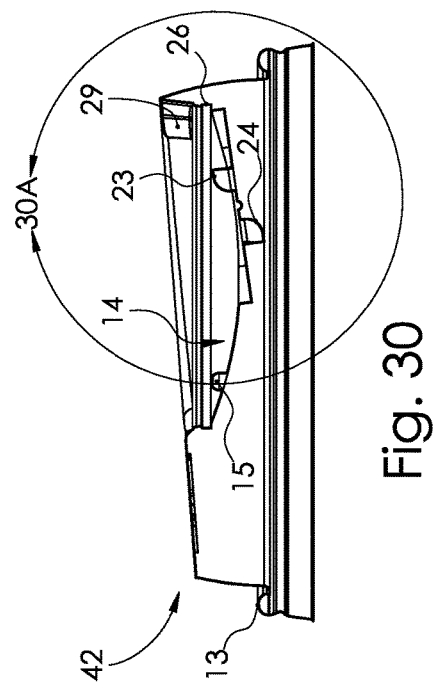
Fig. 30A
Fig. 30

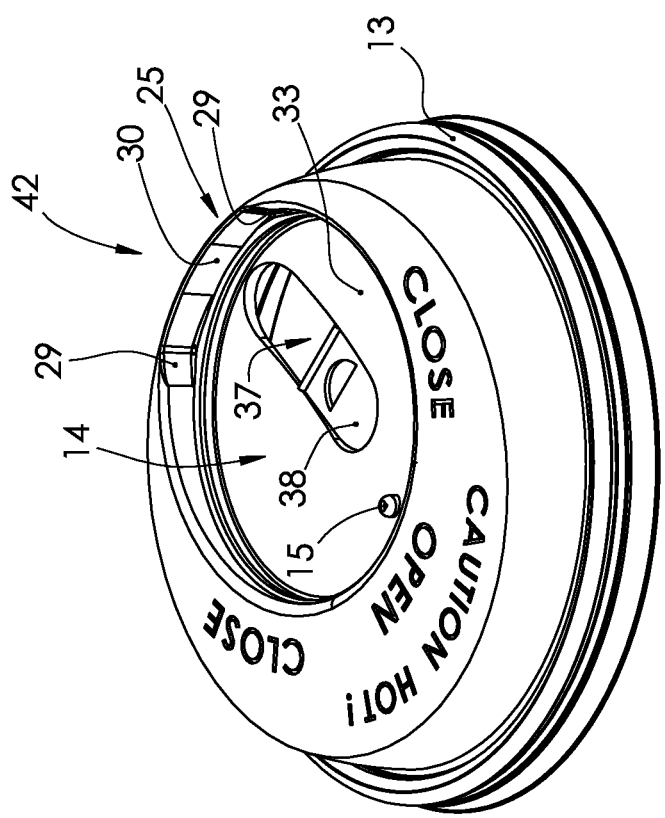
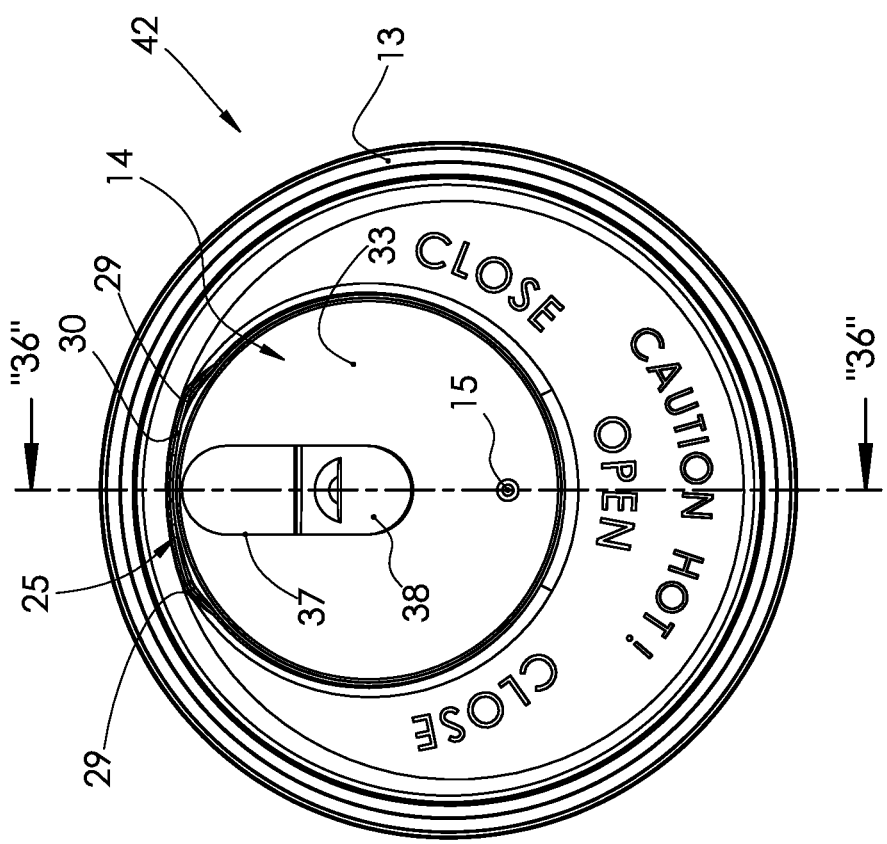

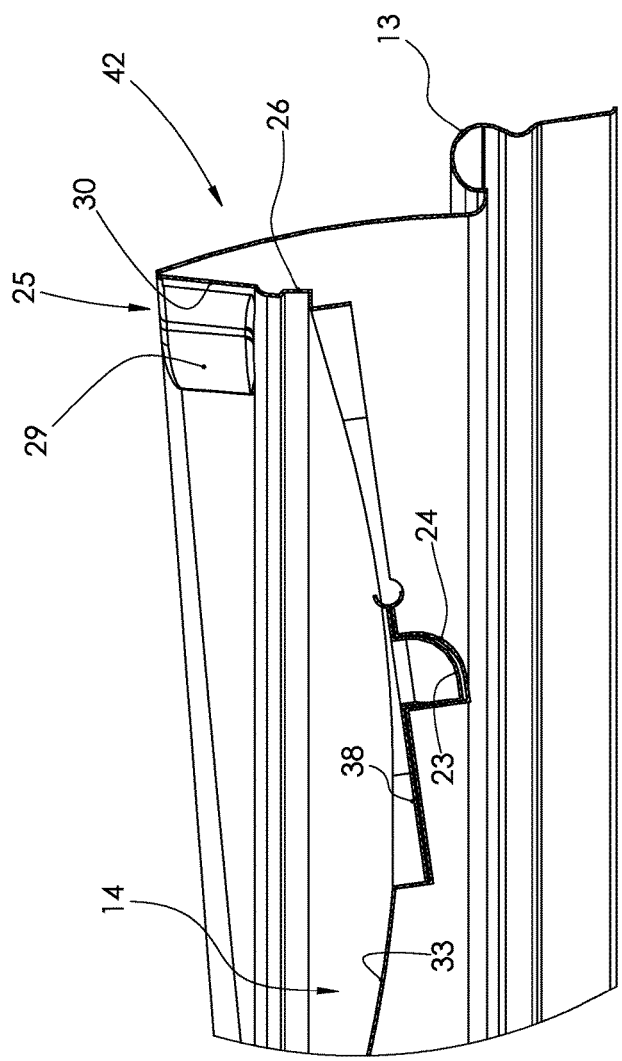
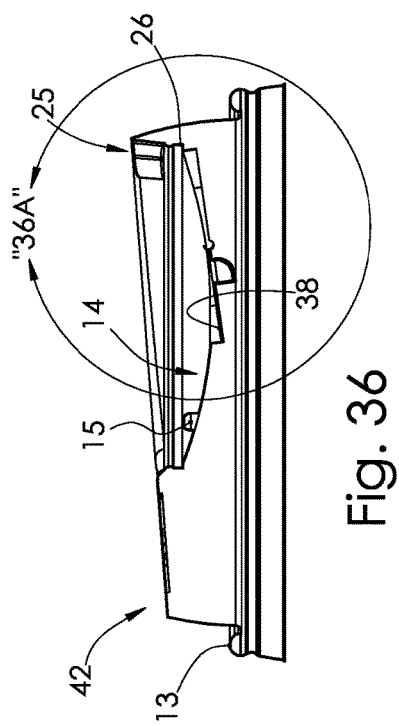

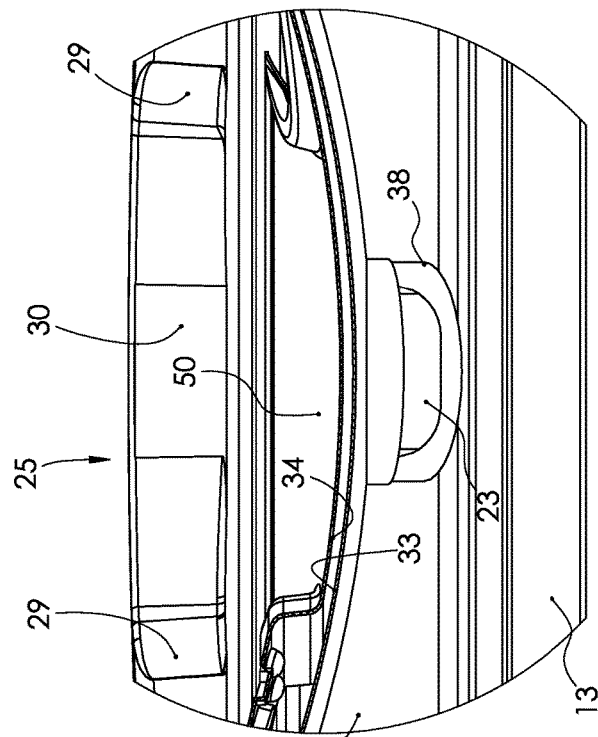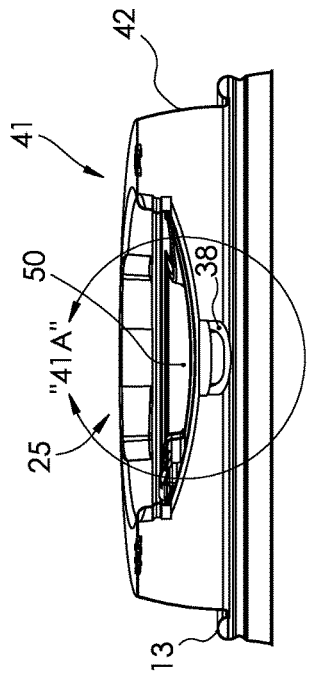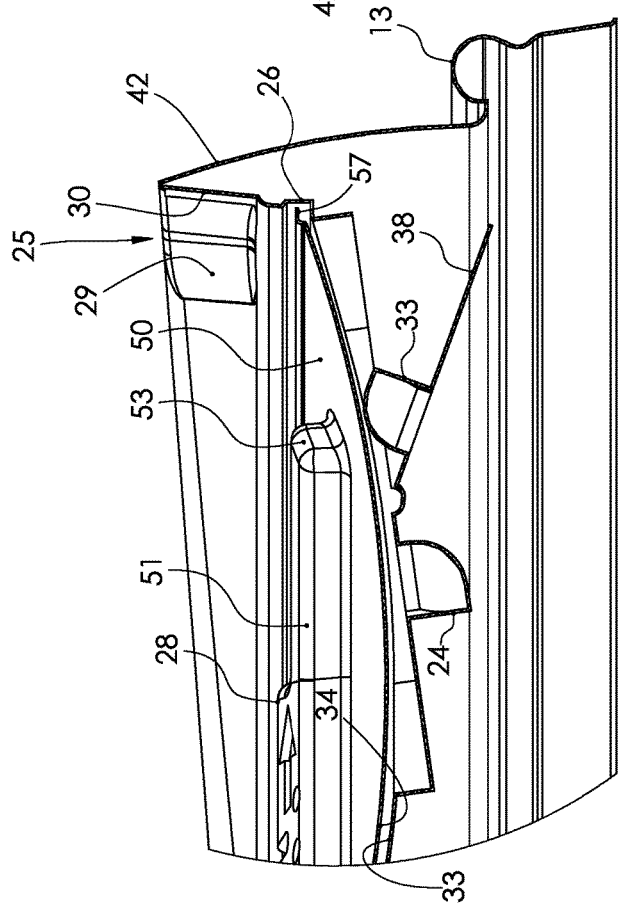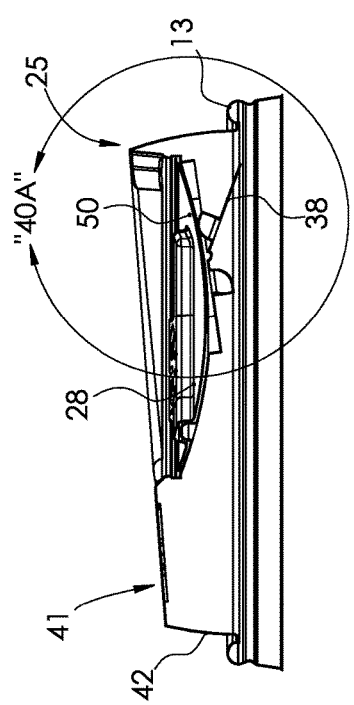
Fig. 40
Fig. 40A
Fig. 41
Fig. 41A

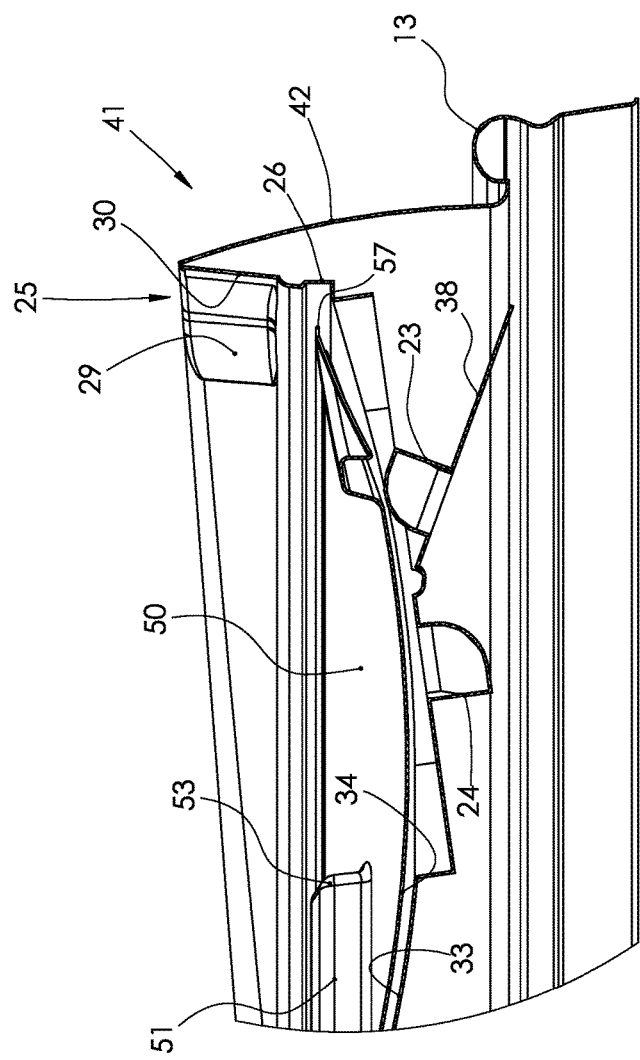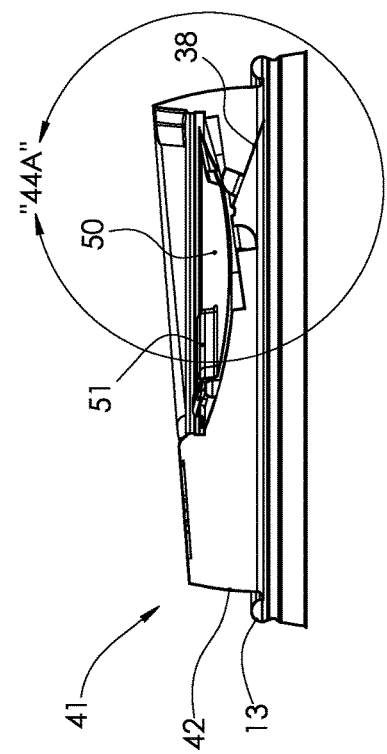
Fig. 44A
Fig. 44

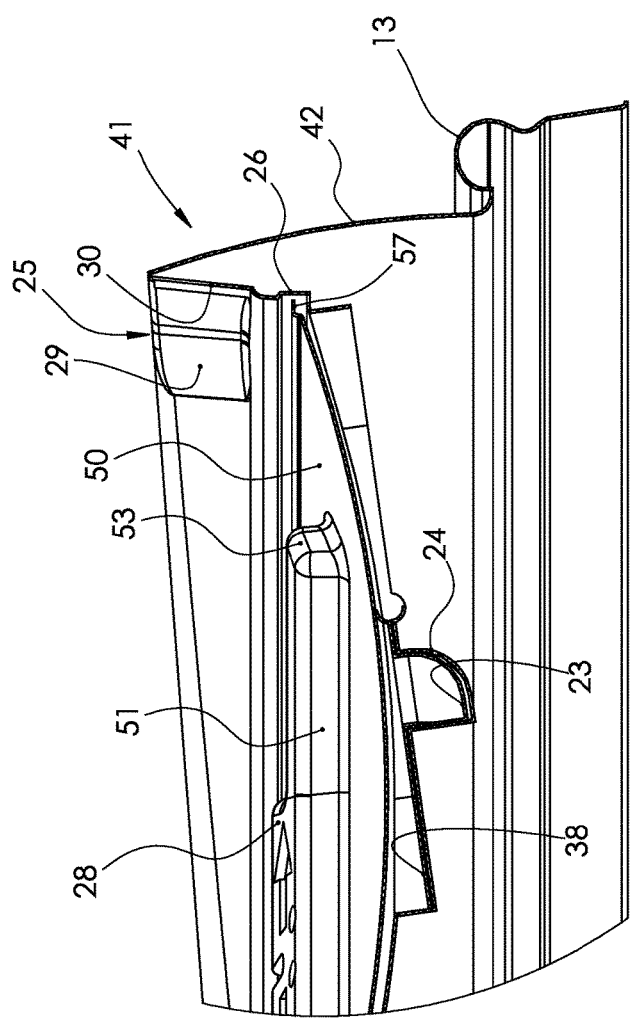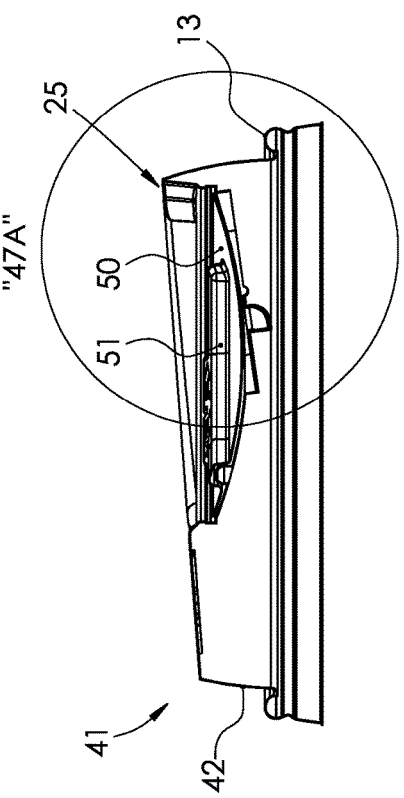
Fig. 47A
Fig. 47

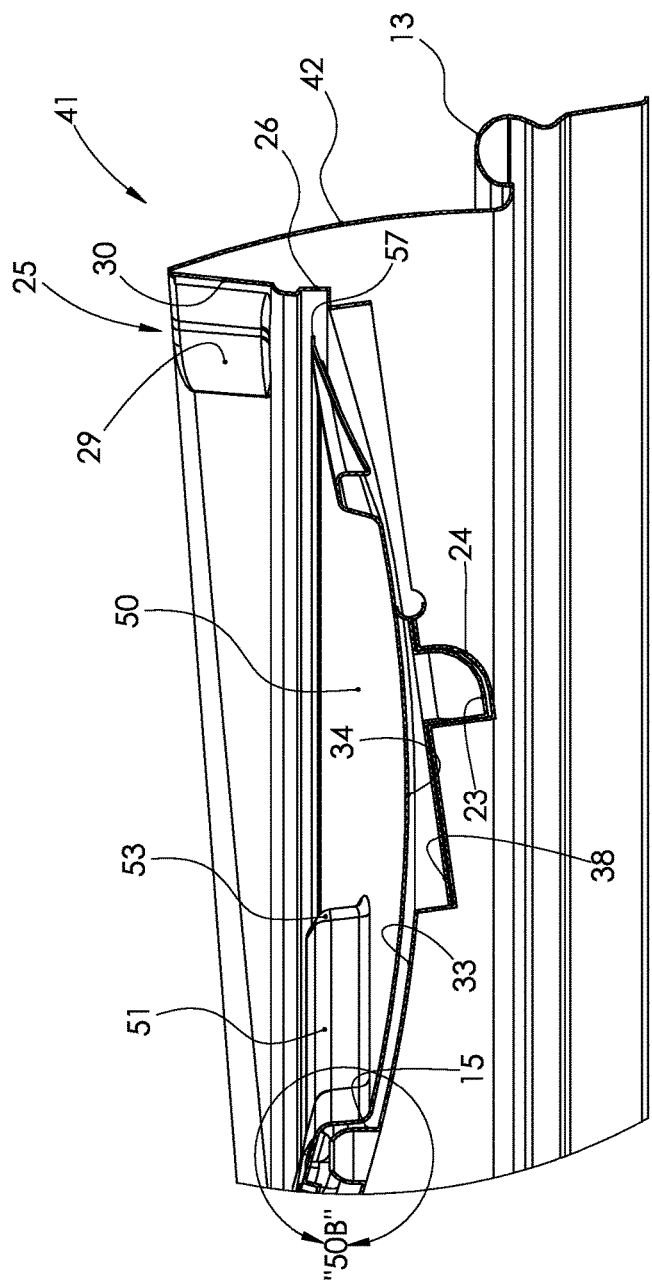
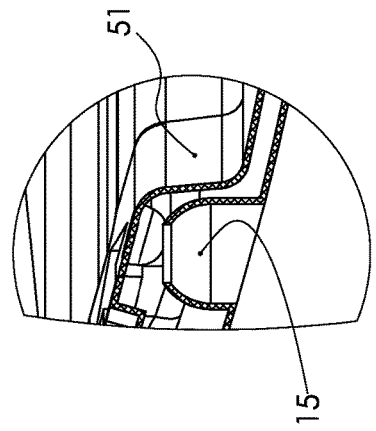

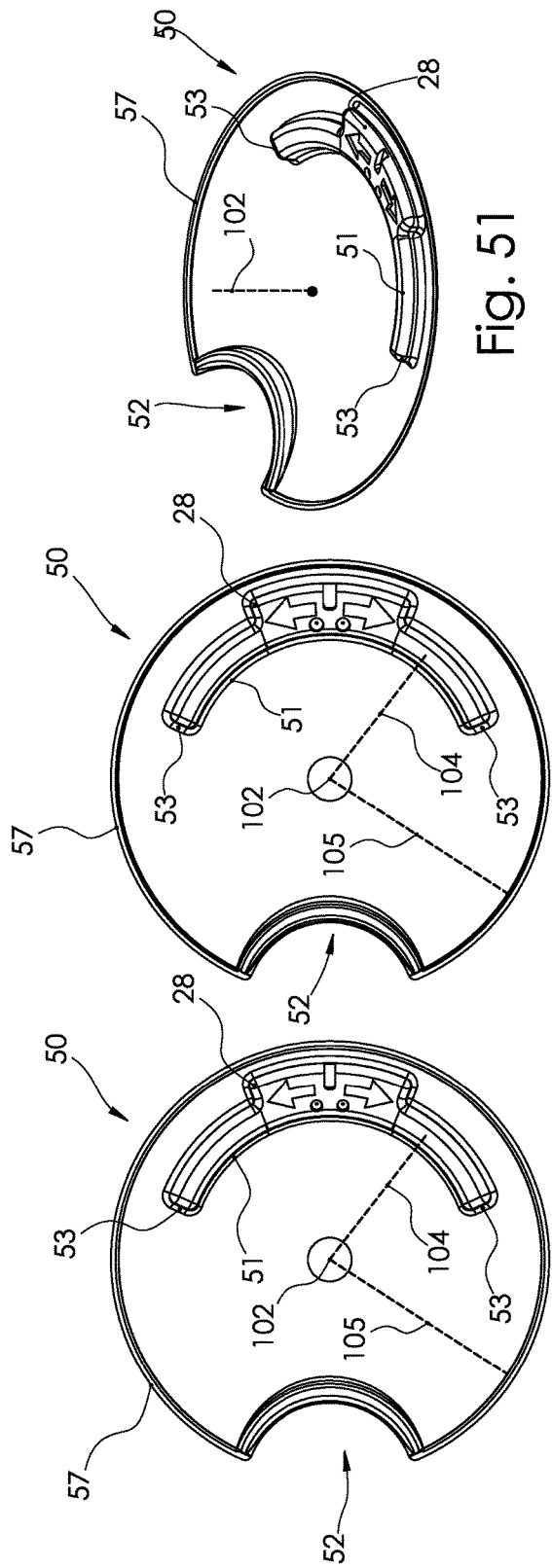
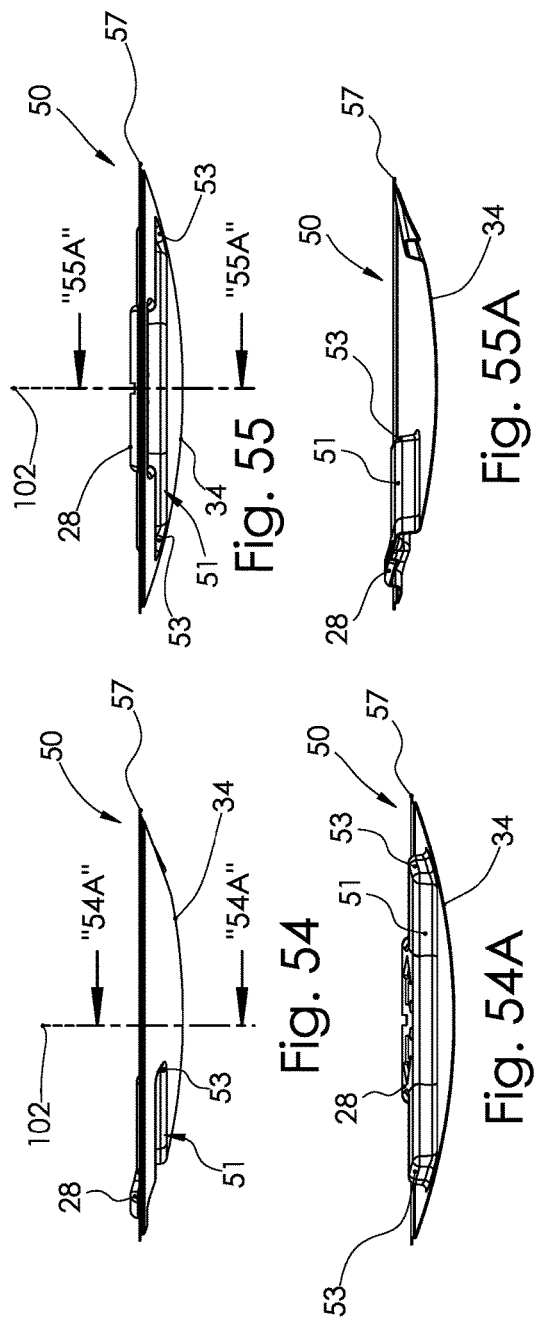

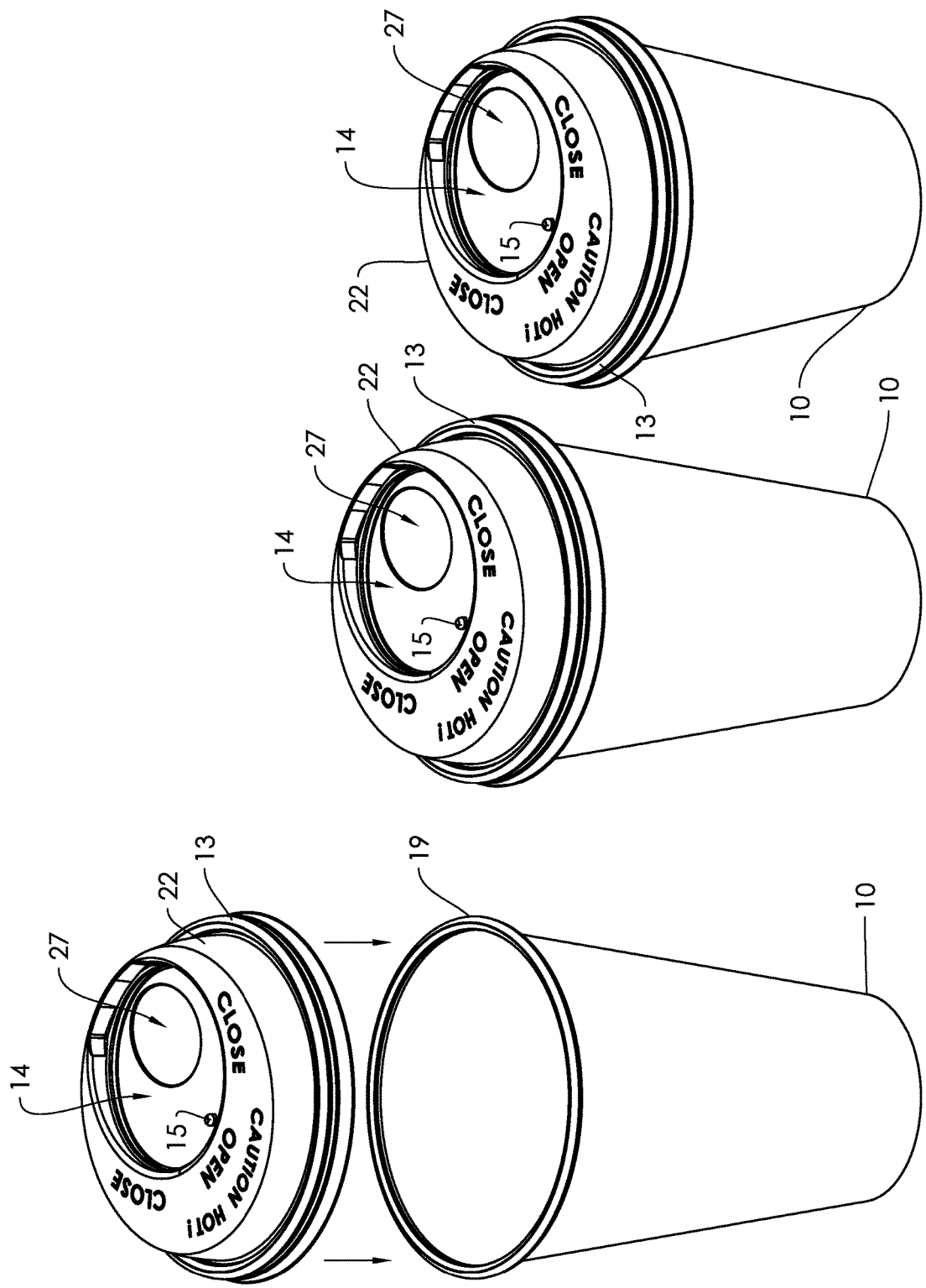

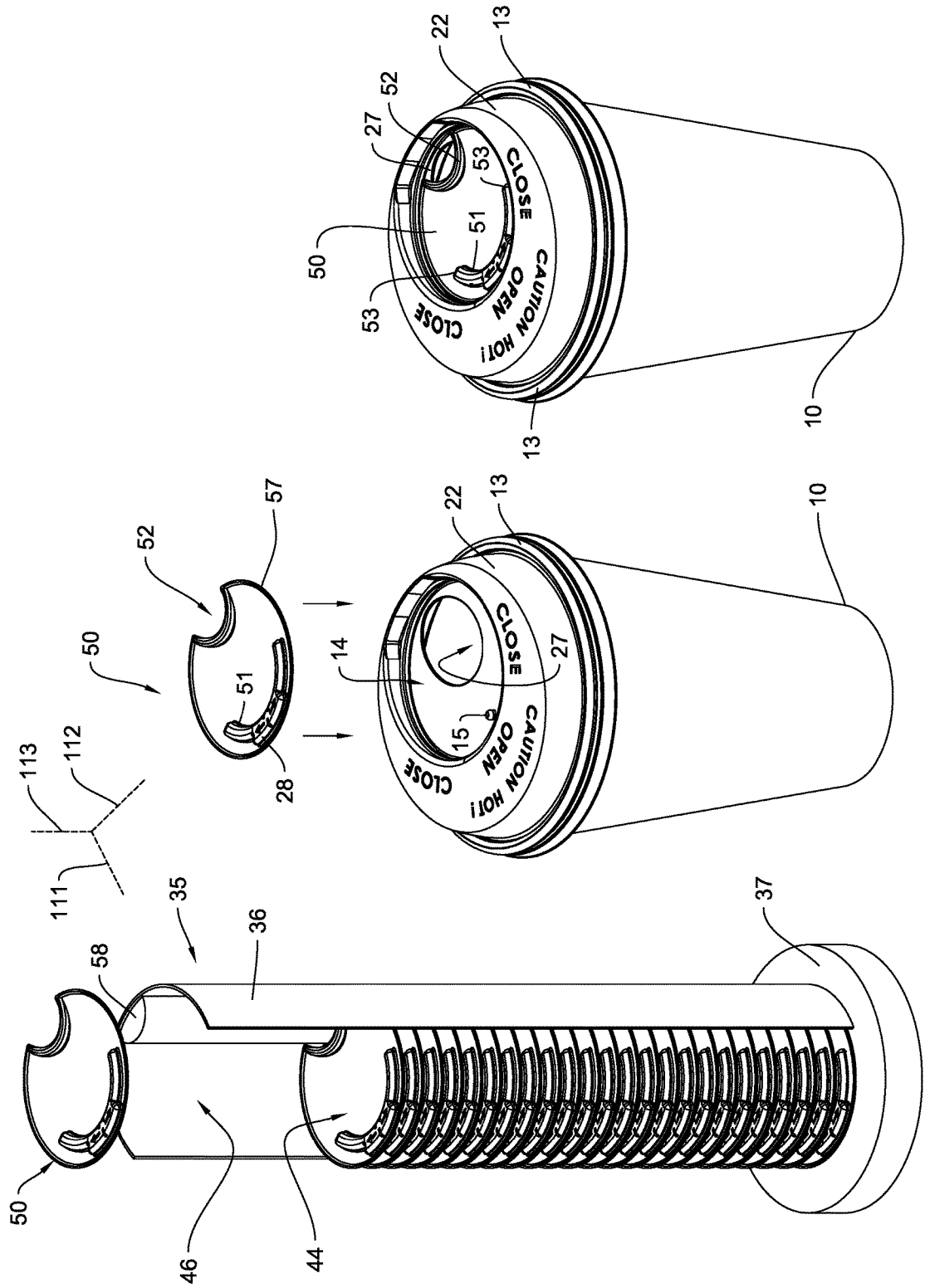

LIQUID CONTAINER LID ASSEMBLY AND METHOD

PRIOR HISTORY

This application claims the benefit of U.S. Provisional Patent Application No. 62/599,585 filed in the United States Patent and Trademark Office on 15 Dec. 2017.

BACKGROUND OF THE INVENTION

Field of the Invention

The present invention generally relates to a lid assembly for outfitting a liquid container. More particularly, the present invention relates to certain lid assembly variants for outfitting a liquid container exemplified by a coffee cup for enabling the user to selectively open and close the lid assembly to either allow or prevent liquid egression from the liquid container. Certain lid assembly methods are further supported by the following specifications.

Brief Description of the Prior Art

The broad field of lids for hot beverage containers and hot beverage container assemblies inclusive of lid assemblies is well-developed. Some of the more pertinent prior is believed to be briefly described hereinafter. U.S. Pat. No. 5,873,493 ('493 patent), issued to Robinson, for example, discloses an Integrally Molded Measurer Dispenser. The '493 patent describes a closure providing a side wall having first and second distal ends, an inner surface and an outer perimeter. A cone-shaped divider projects inwardly and upwardly from a lower perimeter of the side wall and includes a drain-back orifice therethrough. The cone-shaped divider further includes an apex having an opening therethrough. The closure further provides a lid pivotally attached at an outer diameter thereof to the outer perimeter of the side wall first distal end by an integral hinge. The lid includes a shaped substantially conforming to the side wall perimeter.

U.S. Pat. No. 6,176,390 ('390 patent), which issued to Kemp, discloses a Container Lid with Cooling Reservoir. The '390 patent describes a container lid with a cooling reservoir for releasably covering a disposable cup containing a hot beverage. The cooling reservoir includes a side wall with a small opening to allow a small volume of the hot beverage to pass into the cooling reservoir in which the beverage sufficiently cools down to enable the consumer to sip the beverage.

U.S. Pat. No. 6,488,173 ('173 patent), issued to Milan, discloses a Beverage container lid having baffle arrangement for liquid cooling. The '173 patent describes a removable beverage container lid wherein the lid has a substantially enclosed space defined between an exterior cover and an interior cover. At least one inlet opening is formed in the interior cover directing a hot beverage to flow into the substantially enclosed space. Attached to the interior cover at the forward edge of the inlet opening is a partition or wall assembly having a height extending to be located substantially against the exterior cover and a length at least equal to the length of the inlet opening. Between the partition or wall assembly and the peripheral edge of the exterior cover is located a gap area. Connected with the gap area is a dispensing opening formed in the exterior cover. Hot beverage is required to flow around the partition or wall assembly and into the gap area prior to flowing through the dispensing opening exteriorly of a beverage container.

U.S. Pat. No. 7,448,510 ('510 patent), issued to Pavlopoulos, discloses a Cup Assembly having a Cooling Compartment. The '510 patent describes a cup assembly comprising a cup and a lid to define therebetween a first passage and a second passage to allow a liquid cooling compartment between the lid and the cup to be filled with liquid contained in the cup when the first passage is clear and the second passage is blocked and the liquid in the liquid cooling compartment is able to flow out of an outlet in communication with the liquid cooling compartment when the second passage is clear and the first passage is blocked.

United States Patent Application No. 2007/0062943, which was authored by Bosworth, Sr., describes a container lid for a cup-type beverage which includes within the lid a disc-shaped media in which the lid is adapted to be releasably affixed to the beverage container and where the lid is protected from the beverage within the container and wherein the disc may be removed from the lid and utilized for entertainment purposes.

United States Patent Application No. 2010/0264150, which was authored by Leon et al., describes a disposable beverage cup a disposable beverage cup that comprises a ledge between the cup's rim and the grasping portion of the cup that is commonly held in the user's hand. The ledge, which comprises a curb, a horizontal plane, and one or more indentations, acts as a barrier between the user's hand and other objects, preventing a lid that has been press fit onto the cup's rim from being dislodged. In order to remove the lid, the user must insert a finger and/or thumb into the indentation(s) and press upward on the lid. The cup has a contour between the ledge and the grasping portion with ergonomic features to increase the user's comfort in handling the cup.

United States Patent Application No. 2010/0320220, which was authored by Hussey et al., describes a plastic lid for a drinks container, for example, a coffee cup. The plastic lid is provided with an ancillary access facility in the form of an opening or a part of the lid easily removable to form an opening. The ancillary access facility allows a person to drink from the container without removal of the lid. After the ancillary access facility has been cleaned or de-contaminated it is protected by the application of a protective cover.

The protective cover may have a variety of shapes, for example, it may cover the entire lid or it may cover only a selected part of the lid, for example, only the area of the lid involving the ancillary access facility. The protective cover protects the ancillary access facility from the inadvertent transfer of germs to the drinking area by the person dispensing the drinks as they push the lid down with their hands to seal the lid to the container top. The protective covers are arranged to be easily stripped from the lid by the application of mere finger pressure.

From a consideration of the foregoing, it will be noted that the prior art perceives a need for a low cost, disposable combination lid-insert construction or lid assembly for allowing users to fill liquid containers via a lower lid body while attached to a liquid container and successively outfit the lower lid body with an upper lid body insert that may be manually operated to selectively open and close the lid assembly as summarized in more detail hereinafter.

SUMMARY OF THE INVENTION

To achieve the aforementioned and other readily apparent objectives, the present invention essentially discloses in certain variants or embodiments a lid assembly for attachment to a liquid container or for otherwise outfitting a liquid container along with an insert stacking apparatus for aiding in lid assembly and certain associated methods. The lid assembly embodiments according to the present invention all y essentially comprises a lower lid body and an upper lid body insert.

The lid body embodiments essentially comprise a rim-receiving groove, an insert-receiving depression, and a channel-guiding protuberance. The channel-guiding protuberance is formed at an upper depression surface of the insert-receiving depression. The insert-receiving depression is outfitted with a primary liquid outlet for enabling liquid egression therethrough. The rim-receiving groove attaches the lid body to a container rim of a liquid container.

The lid body insert embodiments are each receivable in the insert-receiving depression and comprise a protuberance-receiving channel, a secondary liquid outlet, and an insert axis. The protuberance-receiving channel receives the channel-guiding protuberance when the lid body insert is received in the insert-receiving depression. The lid body insert is rotatable about the insert axis intermediate first and second closed lid positions.

The protuberance-receiving channel comprises opposed terminal ends, which opposed terminal ends engage the channel-guiding protuberance and prevent rotation of the lid body insert relative to the lid body at the first and second closed lid positions. The secondary liquid outlet is positionable in superior adjacency to the primary liquid outlet when in an open lid position intermediate the first and second closed lid positions for enabling liquid egression via both the primary and secondary liquid outlets. The secondary liquid outlet is positionable in lateral adjacency to the primary liquid outlet when in the first and second closed lid positions for preventing liquid egression via the lid assembly.

Other preferred options for the lid assembly include an off-centered depression relative to the rim-receiving groove of the lid body. In other words, the rim-receiving groove extends radially equidistant from a lid body axis and the insert-receiving depression comprises a depression axis. The lid body axis and the depression axis are parallel to one another such that the insert-receiving depression is off-centered relative to the rim-receiving groove generally defining the outer extent of the lid body.

The lid body may preferably comprise an insert edge-receiving track and the lid body insert may preferably comprise an outer insert edge. The insert edge-receiving track receives the outer insert edge when the lid body insert is received in the insert-receiving depression. The insert edge-receiving track enhances rotation of the lid body insert relative to the lid body and prevents inadvertent removal of the lid body insert from the lid body.

Further, the primary liquid outlet may preferably comprise an outlet cover in certain embodiments, which outlet cover selectively prevents liquid egression through the primary liquid outlet. The outlet cover may preferably comprise an upwardly extending knob or protuberance. The upwardly extending knob enables a user to more easily manually grab and maneuver the outlet cover from an outlet-covering position to an outlet-opening position. The insert-receiving depression may preferably comprise a protuberance-receiving depression for receiving and retaining the upwardly extending knob when the outlet cover is in a select outlet-opening position.

The lid body may preferably comprise a liquid spillway in anterior adjacency to the primary liquid outlet for enhancing liquid delivery. The liquid spillway may preferably be characterized by comprising an arcuate central portion and laterally opposed guideways. The laterally opposed guideways extend obliquely relative to the arcuate central portion for guiding liquid toward the arcuate central portion thereby enhancing liquid migration over the liquid spillway.

The protuberance-receiving channel may preferably comprise an arc length intermediate the opposed terminal ends having a channel radius of curvature lesser in magnitude relative to an outer insert radius of curvature and is dimensioned in length so as to position the secondary liquid outlet in lateral adjacency to the liquid spillway when in a select closed lid position. A select terminal end may be further positioned in lateral adjacency to the liquid spillway when in the select closed lid position. The select terminal end and the secondary liquid outlet thereby preferably flank the liquid spillway when in the select closed lid position.

The container lid assembly system according to the present invention may be said to essentially comprise, in combination a lid insert stacking apparatus and at least two lid body inserts. The lid insert stacking apparatus preferably comprises a cradle wall and a base portion. The cradle wall is preferably arcuate in first and second cradle dimensions and extends elongate in a third cradle dimension. The lid body inserts are stackable inwardly of the cradle wall, each of which preferably comprise an outer insert edge. The cradle wall engages the outer insert edges of the lid body inserts for aligning the lid body inserts into a stacked column of lid body inserts extending in the third cradle dimension.

The lid insert stacking apparatus may further preferably comprise an outlet alignment hub. The outlet alignment hub is preferably arcuate in the first and second cradle dimensions and extends in the third cradle dimension. The outlet alignment hub is insertable into the secondary liquid outlets of the lid body inserts for enhancing alignment of the lid body inserts as stacked within the stacked column of lid body inserts. The cradle wall is preferably semicircular in the first and second cradle dimensions for enhancing/maximizing anterior access to the stacked column of lid body inserts while maximizing alignment contact with the outer insert edges within the stacked column.

Further, the cradle wall may be preferably outfitted with a press mechanism at an upper end of the cradle wall. The press mechanism interfaces intermediate a user's hand and an uppermost lid body insert for transferring a force into the stacked column for disengaging a lowermost lid body insert from a lower end of the stacked column. Noting that the lid bodies according to the present invention each comprise an insert-receiving depression, the lowermost lid body insert is receivable in the insert-receiving depression of a targeted lid body when disengaged from the lower end of the stacked column.

The contemplated container lid assembly method according to the present invention may be said to comprise the steps of inserting a first and a second lid body insert into a lid insert stacking apparatus, and stacking the first and second lid body inserts inwardly of the cradle wall into a stacked column of lid body inserts. Outer insert edging of the first and second body inserts may engage the cradle wall for aligning the first and second lid body inserts in the stacked column of lid body inserts. The outlet alignment hub of the insert stacking apparatus is insertable into liquid outlets of the first and second lid body inserts for enhancing alignment of the first and second lid body inserts as stacked within the stacked column.

The cradle wall of the insert stacking apparatus is preferably semicircular in the first and second cradle dimensions thereby providing an anterior access opening to the cradle wall. The first and second and successive lid body inserts may thus be inserted into the lid insert stacking apparatus via the anterior access opening. The cradle wall may be further outfitted with a press mechanism at an upper end of the cradle wall for interfacing intermediate a user's hand and an uppermost lid body insert. The method may be said to further comprise the steps of transferring a force into the stacked column for disengaging a lowermost lid body insert from a lower end of the stacked column, and receiving the lowermost lid body insert in an insert-receiving depression of a lid body when disengaged from the lower end of the stacked column.

BRIEF DESCRIPTION OF THE DRAWINGS

Other features of the invention will become more evident from a consideration of the following brief descriptions of patent drawings:

FIG. 1 is a top posterior perspective view of a first lower lid body according to the present invention.

FIG. 2 is a top plan view of the first lower lid body according to the present invention.

FIG. 3 is a bottom plan view of the first lower lid body according to the present invention.

FIG. 4 is a posterior edge elevational view of the first lower lid body according to the present invention.

FIG. 5 is a frontal type cross-sectional view of the first lower lid body according to the present invention as sectioned from FIG. 2 from a posterior view to show in greater detail structures otherwise obscured by posterior portions of the first lower lid body.

FIG. 5A is an enlarged, fragmentary sectional view as enlarged and sectioned from FIG. 5 to show in still greater clarity structural details of the first lower lid body.

FIG. 6 is a medial type cross-sectional view of the first lower lid body according to the present invention as sectioned from FIG. 2 from a lateral view to show in greater detail structures otherwise obscured by lateral portions of the first lower lid body.

FIG. 6A is an enlarged, fragmentary sectional view as enlarged and sectioned from FIG. 6 to show in still greater clarity structural details of the first lower lid body.

FIG. 11 is a frontal type cross-sectional view of the first lid embodiment ensemble or lid assembly according to the present invention as sectioned from FIG. 8 from a posterior view to show in greater detail structures otherwise obscured by posterior portions of the first lower lid body.

FIG. 11A is an enlarged, fragmentary sectional view as enlarged and sectioned from FIG. 11 to show in still greater clarity structural details of the first lid embodiment ensemble or lid assembly.

FIG. 18 is a medial type cross-sectional view of the second lower lid body according to the present invention as sectioned from FIG. 14 from a lateral view to show in greater detail structures otherwise obscured by lateral portions of the second lower lid body.

FIG. 18A is an enlarged, fragmentary sectional view as enlarged and sectioned from FIG. 18 to show in still greater clarity structural details of the second lower lid body.

FIG. 19 is a top posterior perspective view of a second lid embodiment ensemble or lid assembly with the upper lid body insert and second lower lid body according to the present invention, the second lid embodiment ensemble or lid assembly being depicted in an open lid configuration.

FIG. 20 is a top plan view of the second lid embodiment ensemble or lid assembly according to the present invention, the second lid embodiment ensemble or lid assembly being depicted in an open lid configuration.

FIG. 21 is a bottom plan view of the second lid embodiment ensemble or lid assembly according to the present invention, the second lid embodiment ensemble or lid assembly being depicted in an open lid configuration.

FIG. 22 is a posterior edge elevational view of the second lid embodiment ensemble or lid assembly according to the present invention.

FIG. 24 is an enlarged medial type cross-sectional view of the second lid embodiment ensemble or lid assembly according to the present invention as sectioned from a lateral view to show in greater detail structures otherwise obscured by lateral portions of the second lower lid body.

FIG. 25 is a first top posterior perspective view of a third lower lid body according to the present invention shown in an open configuration with a pivotal aperture or outlet cover in a partially open state.

FIG. 26 is a second top posterior perspective view of the third lower lid body according to the present invention shown in a closed configuration with the pivotal aperture or outlet cover in a closed state.

FIG. 27 is a third top posterior perspective view of the third lower lid body according to the present invention shown in an open configuration with the pivotal aperture or outlet cover in a fully open state.

FIG. 27A is a top posterior perspective view of a third lid embodiment ensemble or lid assembly with the upper lid body insert and the third lower lid body according to the present invention, the third lid embodiment ensemble or lid assembly being depicted in an open lid configuration.

FIG. 30 is a medial type cross-sectional view of the fourth lower lid body according to the present invention as sectioned from a lateral view to show in greater detail structures otherwise obscured by lateral portions of the fourth lower lid body in the closed configuration.

FIG. 30A is an enlarged, fragmentary sectional view as enlarged and sectioned from FIG. 30 to show in still greater clarity structural details of the fourth lower lid body in the closed configuration.

FIG. 34 is a top posterior perspective view of the fourth lower lid body according to the present invention shown in a fully open configuration with the pivotal aperture or outlet cover in a fully open state.

FIG. 35 is a top plan view of the fourth lower lid body according to the present invention shown in the fully open configuration with the pivotal aperture or outlet cover in a fully open state.

FIG. 36 is a medial type cross-sectional view of the fourth lower lid body according to the present invention as sectioned from FIG. 35 from a lateral view to show in greater detail structures otherwise obscured by lateral portions of the fourth lower lid body in the fully open configuration.

FIG. 36A is an enlarged, fragmentary sectional view as enlarged and sectioned from FIG. 36 to show in still greater clarity structural details of the fourth lower lid body in the fully open configuration.

FIG. 40 is a medial type cross-sectional view of the fourth lid embodiment ensemble or lid assembly according to the present invention as sectioned from FIG. 38 from a lateral view to show in greater detail structures otherwise obscured by lateral portions of the fourth lower lid body in the first of four closed configurations.

FIG. 40A is an enlarged, fragmentary sectional view as enlarged and sectioned from FIG. 40 to show in still greater clarity structural details of the fourth lid embodiment ensemble or lid assembly in the first of four closed configurations.

FIG. 41 is a frontal type cross-sectional view of the fourth lid embodiment ensemble or lid assembly according to the present invention as sectioned from FIG. 38 from a posterior view to show in greater detail structures otherwise obscured by posterior portions of the fourth lower lid body.

FIG. 41A is an enlarged, fragmentary sectional view as enlarged and sectioned from FIG. 41 to show in still greater clarity structural details of the fourth lid embodiment ensemble or lid assembly.

FIG. 44 is a medial type cross-sectional view of the fourth lid embodiment ensemble or lid assembly according to the present invention as sectioned from FIG. 43 from a lateral view to show in greater detail structures otherwise obscured by lateral portions of the fourth lower lid body in the first of two open configurations.

FIG. 44A is an enlarged, fragmentary sectional view as enlarged and sectioned from FIG. 44 to show in still greater clarity structural details of the fourth lid embodiment ensemble or lid assembly in the first of two open configurations.

FIG. 47 is a medial type cross-sectional view of the fourth lid embodiment ensemble or lid assembly according to the present invention as sectioned from a lateral view to show in greater detail structures otherwise obscured by lateral portions of the fourth lower lid body in the second of four closed configurations.

FIG. 47A is an enlarged, fragmentary sectional view as enlarged and sectioned from FIG. 47 to show in still greater clarity structural details of the fourth lid embodiment ensemble or lid assembly in the second of four closed configurations.

FIG. 50A is an enlarged, fragmentary sectional view as enlarged and sectioned from FIG. 50 to show in still greater clarity structural details of the fourth lid embodiment ensemble or lid assembly in the second of two open configurations.

FIG. 50B is an enlarged, fragmentary sectional view as enlarged and sectioned from FIG. 50A to show in still greater clarity structural details of the engagement of the channel-guiding protuberance as received in the protuberance-receiving channel of the fourth lid embodiment ensemble or lid assembly.

FIG. 51 is a top perspective view of the upper lid body insert according to the present invention.

FIG. 52 is a bottom plan view of the upper lid body insert according to the present invention.

FIG. 53 is a top plan view of the upper lid body insert according to the present invention.

FIG. 54 is a lateral edge view of the upper lid body insert according to the present invention.

FIG. 54A is a frontal cross-sectional view as sectioned from FIG. 54 to show further details of the upper lid body insert according to the present invention.

FIG. 55 is a posterior edge view of the upper lid body insert according to the present invention.

FIG. 55A is a medial cross-sectional view as sectioned from FIG. 55 to show further details of the upper lid body insert according to the present invention.

FIG. 56 is a top perspective view of the second lower lid body according to the present invention in exploded relation relative to a tall container.

FIG. 57A is a top perspective view of the second lower lid body according to the present invention in assembled relation with a tall container.

FIG. 57B is a top perspective view of the second lower lid body according to the present invention in assembled relation with a short container.

FIG. 60 is a perspective view of a series of a series of lid body inserts according to the present invention in stacked relation in a ready-to-use condition of use as stacked within an insert stacking apparatus according to the present invention.

FIG. 61 is a top perspective view of the second lower lid body according to the present invention in assembled relation with a tall container with the upper lid body insert exploded from the second lower lid body.

FIG. 62 is a top perspective view of the second lid embodiment ensemble or lid assembly according to the present invention in assembled relation with a tall container.

DETAILED DESCRIPTION OF THE PREFERRED EMBODIMENTS AND METHODOLOGY

Figure 7:
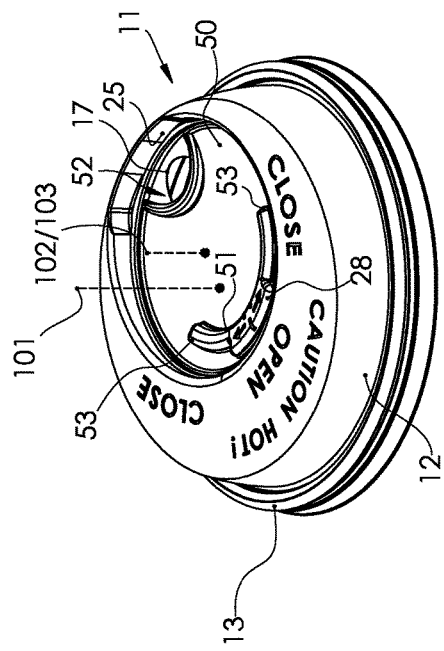
FIG. 7 is a top posterior perspective view of a first lid embodiment ensemble or lid assembly with an upper lid body insert and the first lower lid body according to the present invention, the first lid embodiment ensemble or lid assembly being depicted in an open lid configuration.
Figure 10:
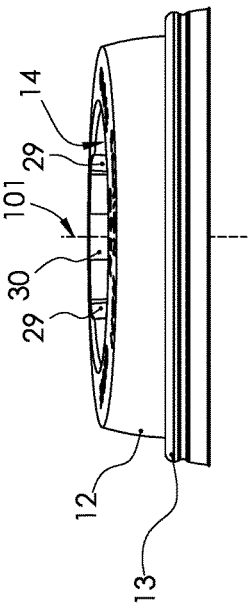
FIG. 10 is a posterior edge elevational view of the first lid embodiment ensemble or lid assembly according to the present invention.
Figure 8:
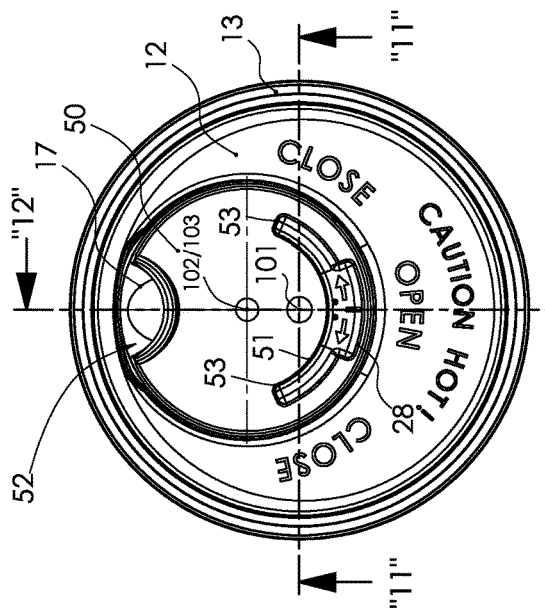
FIG. 8 is a top plan view of the first lid embodiment ensemble or lid assembly according to the present invention, the first lid embodiment ensemble or lid assembly being depicted in an open lid configuration.
Figure 9:
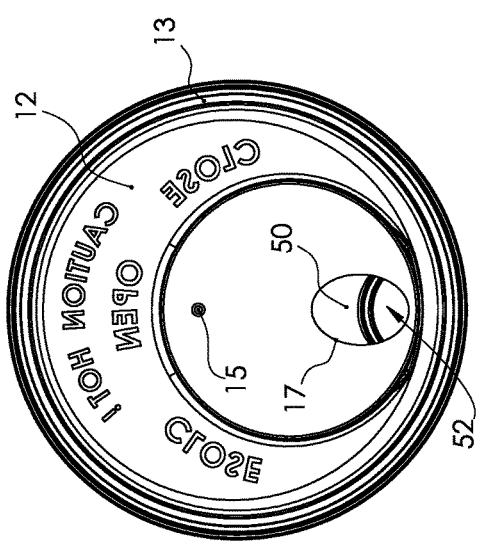
FIG. 9 is a bottom plan view of the first lid embodiment ensemble or lid assembly according to the present invention, the first lid embodiment ensemble or lid assembly being depicted in an open lid configuration.
Figure 12A:
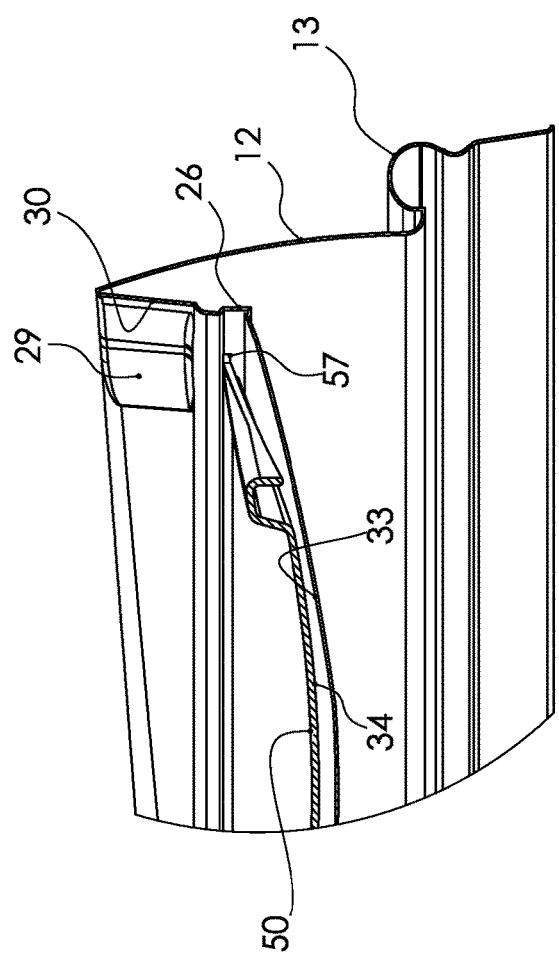
FIG. 12A is an enlarged, fragmentary sectional view as enlarged and sectioned from FIG. 12 to show in still greater clarity structural details of the first lid embodiment ensemble or lid assembly.
Figure 12:
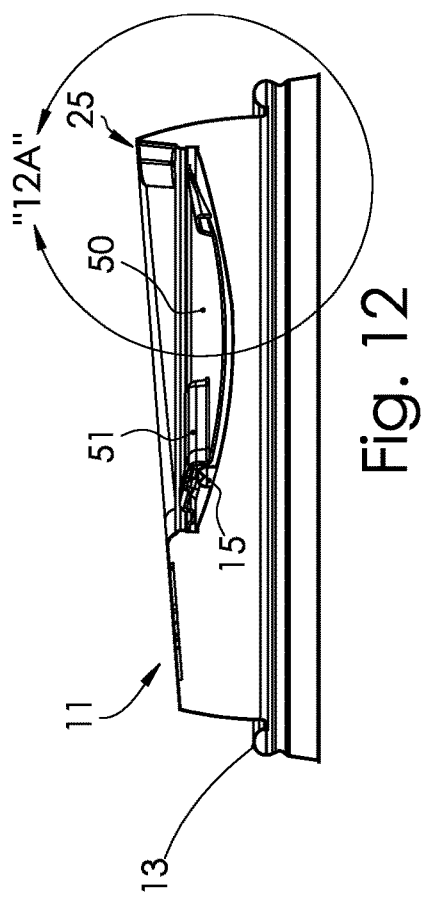
FIG. 12 is a medial type cross-sectional view of the first lid embodiment ensemble or lid assembly according to the present invention sectioned from FIG. 8 from a lateral view to show in greater detail structures otherwise obscured by lateral portions of the first lower lid body.
Figure 13:
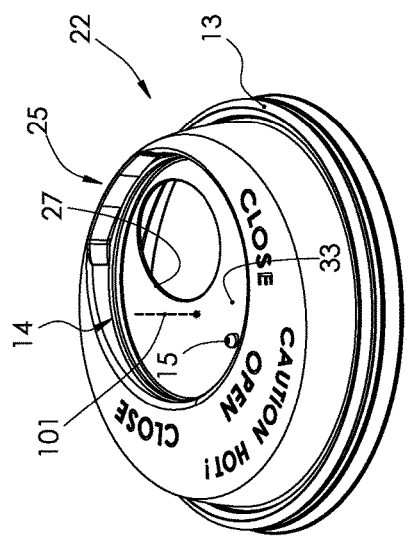
FIG. 13 is a top posterior perspective view of a second lower lid body according to the present invention.
Figure 16:
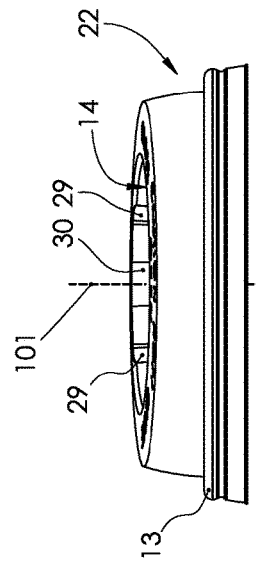
FIG. 16 is a posterior edge elevational view of the second lower lid body according to the present invention.
Figure 14:
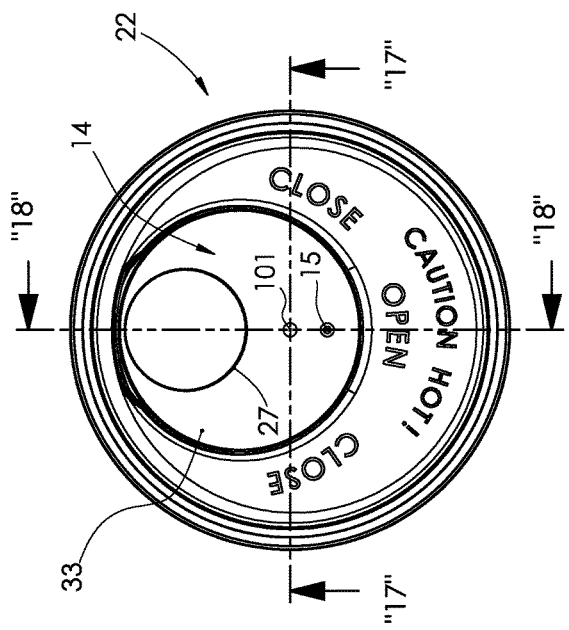
FIG. 14 is a top plan view of the second lower lid body according to the present invention.
Figure 15:
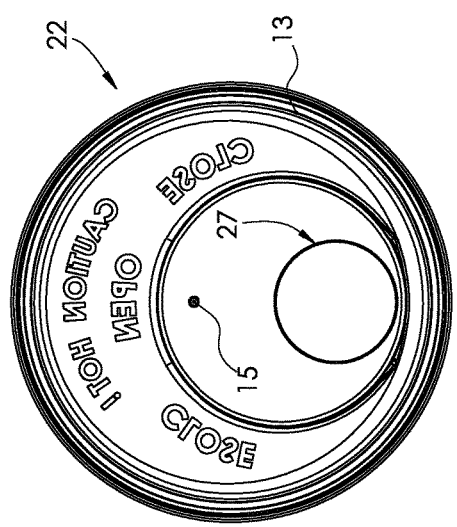
FIG. 15 is a bottom plan view of the second lower lid body according to the present invention.
Figure 17A:
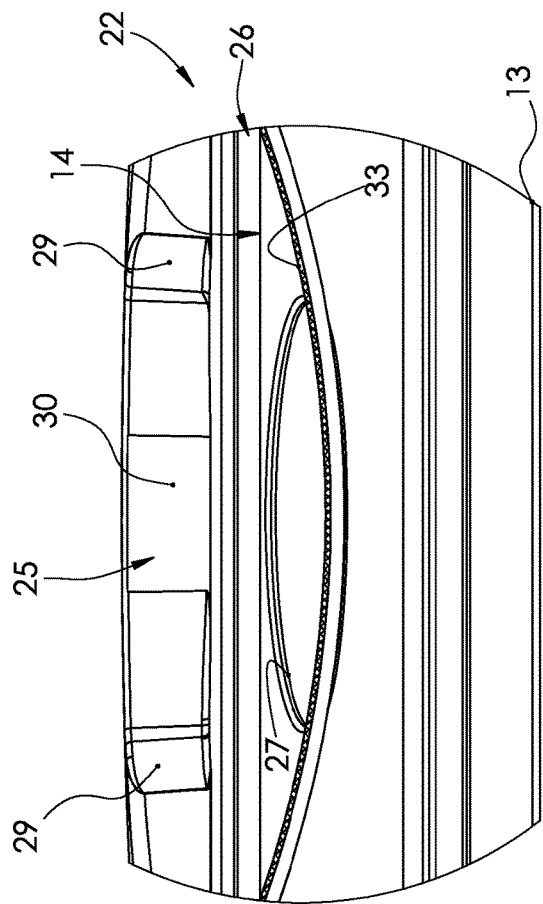
FIG. 17A is an enlarged, fragmentary sectional view as enlarged and sectioned from FIG. 17 to show in still greater clarity structural details of the second lower lid body.
Figure 17:
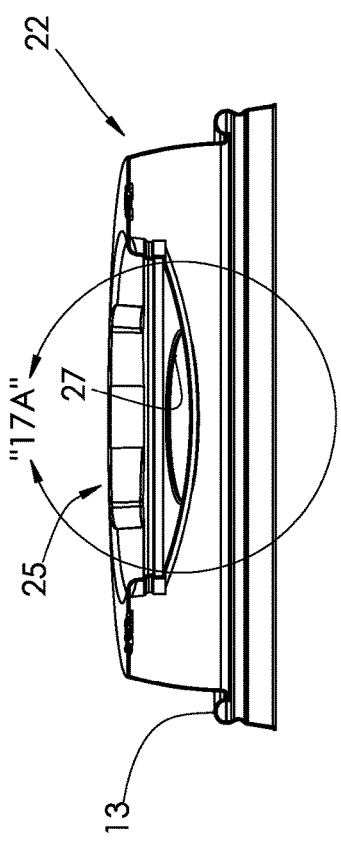
FIG. 17 is a frontal type cross-sectional view of the second lower lid body according to the present invention as sectioned from FIG. 14 from a posterior view to show in greater detail structures otherwise obscured by posterior portions of the second lower lid body.
Figure 23:
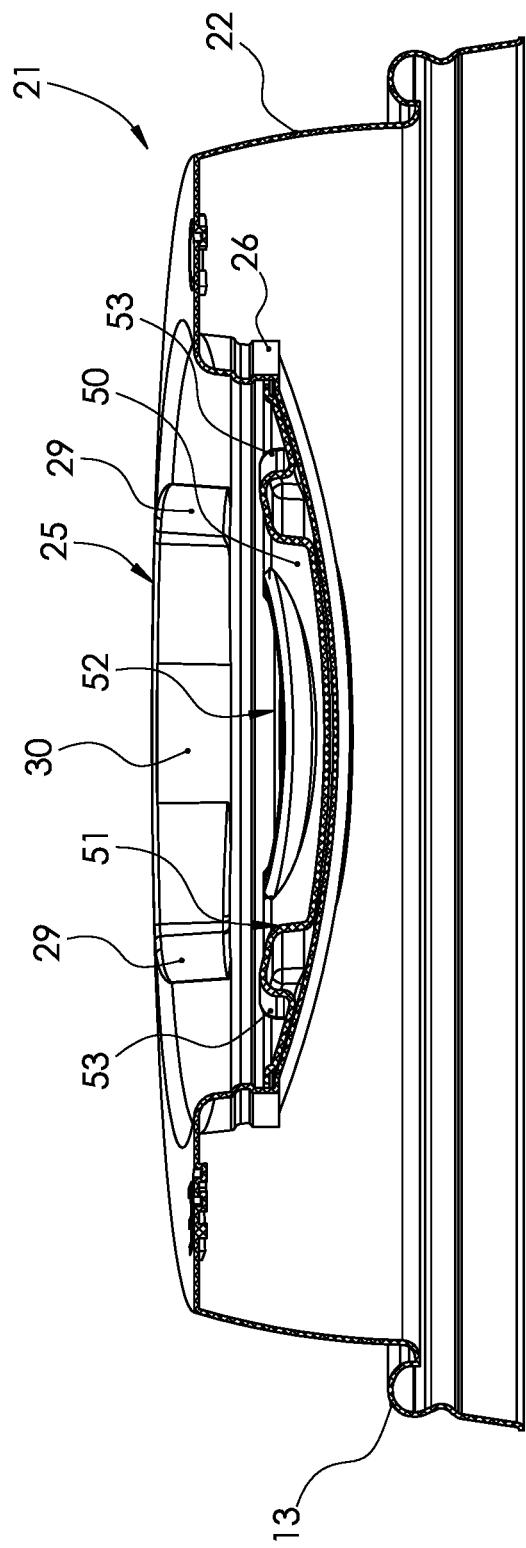
FIG. 23 is an enlarged frontal type cross-sectional view of the second lid embodiment ensemble or lid assembly according to the present invention as sectioned from FIG. 20 from a posterior view to show in greater detail structures otherwise obscured by posterior portions of the second lower lid body.
Figure 28:
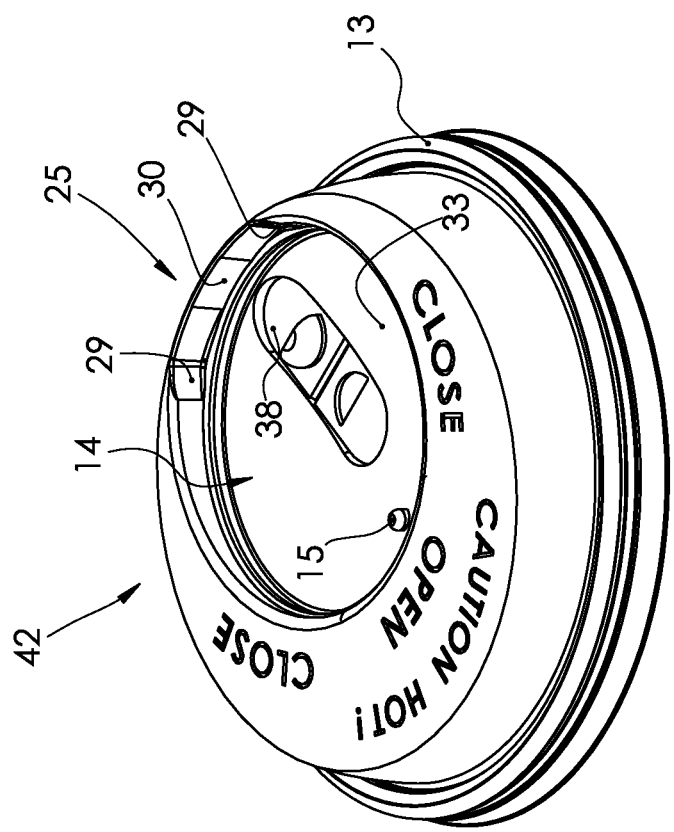
FIG. 28 is a top posterior perspective view of a fourth lower lid body according to the present invention shown in a closed configuration with the pivotal aperture or outlet cover in a fully closed state.
Figure 29:
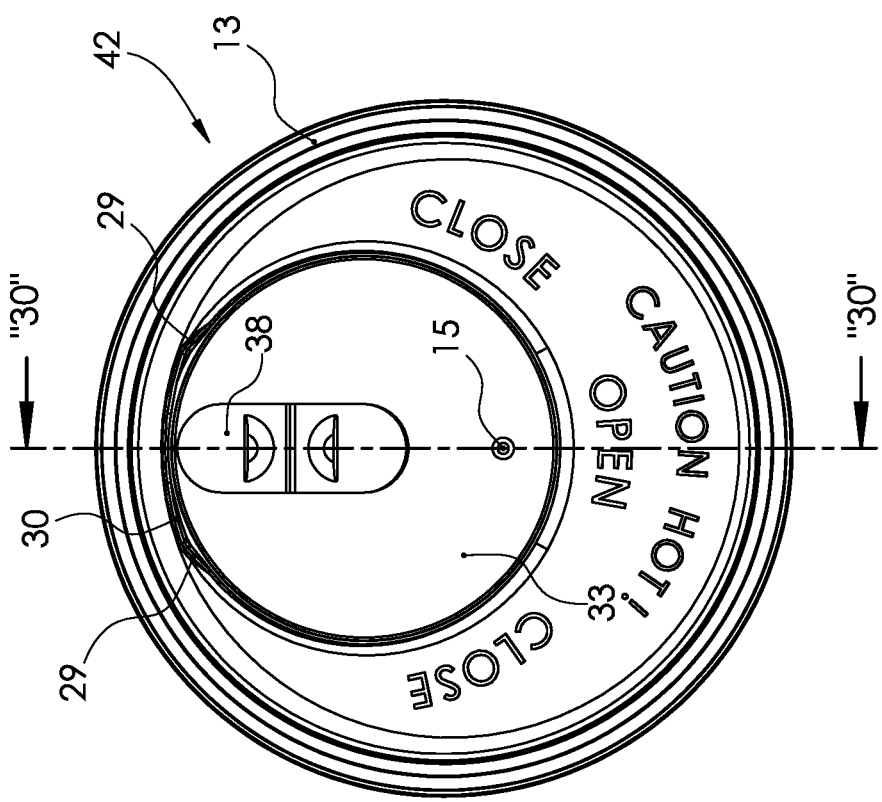
FIG. 29 is a top plan view of the fourth lower lid body according to the present invention shown in a closed configuration with the pivotal aperture or outlet cover in a fully closed state.
Figure 31:
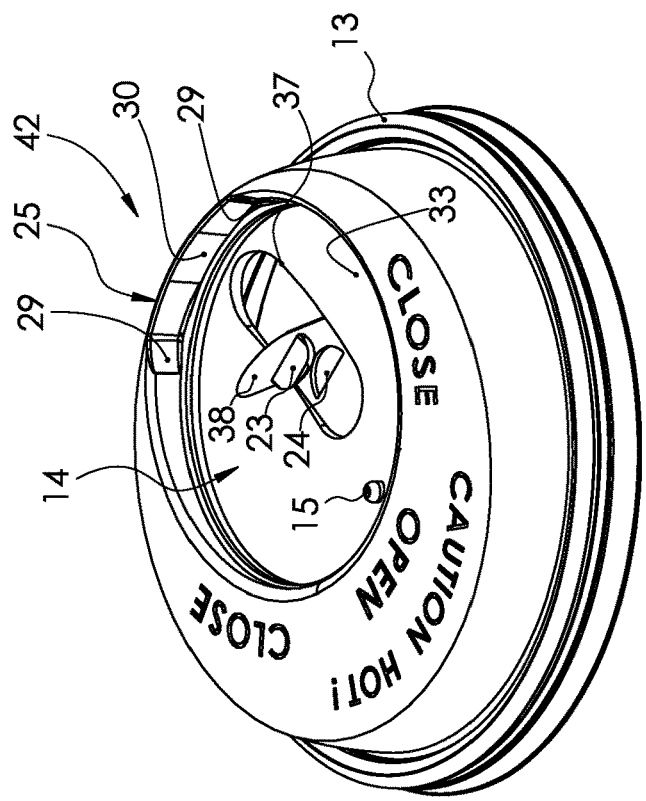
FIG. 31 is a top posterior perspective view of the fourth lower lid body according to the present invention shown in an open configuration with the pivotal aperture or outlet cover in a partially open state.
Figure 32:
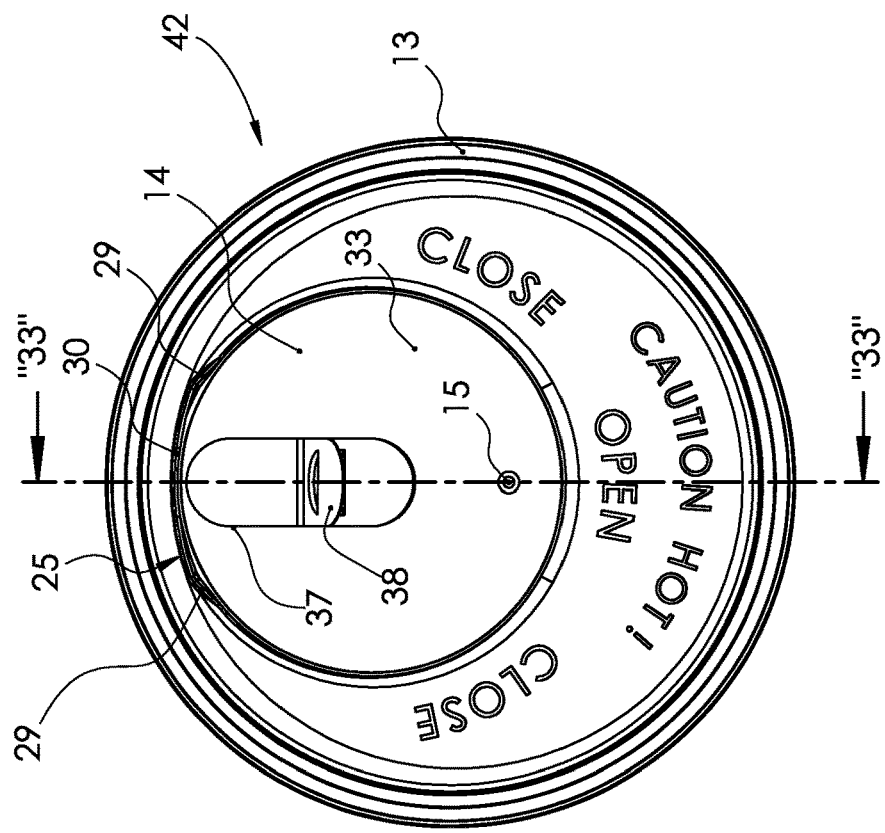
FIG. 32 is a top plan view of the fourth lower lid body according to the present invention shown in the open configuration with the pivotal aperture or outlet cover in a partially open state.
Figure 33A:
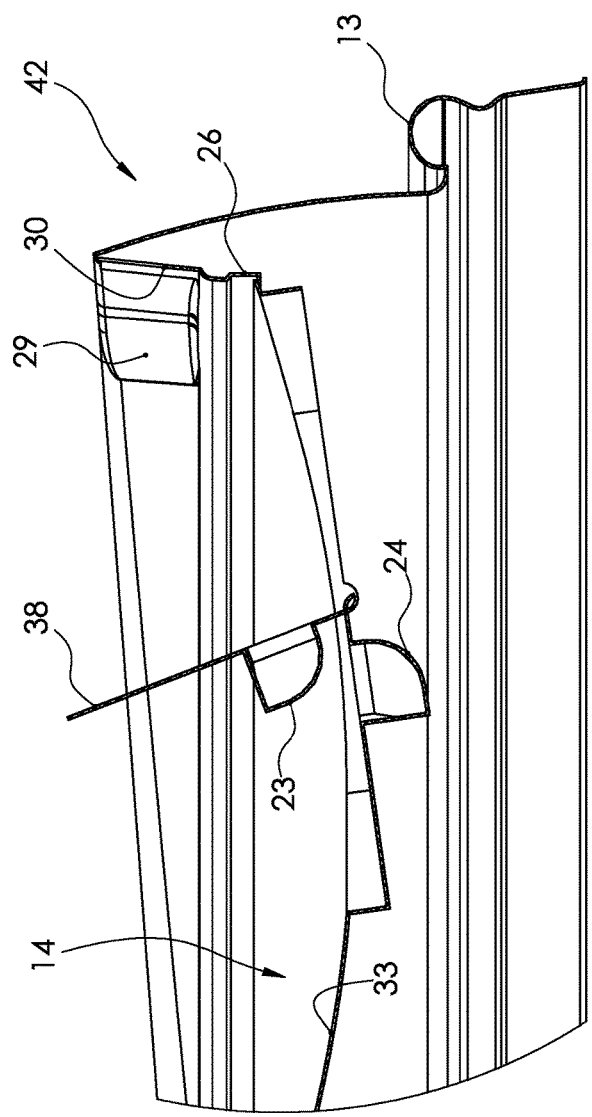
FIG. 33A is an enlarged, fragmentary sectional view as enlarged and sectioned from FIG. 33 to show in still greater clarity structural details of the fourth lower lid body.
Figure 33:
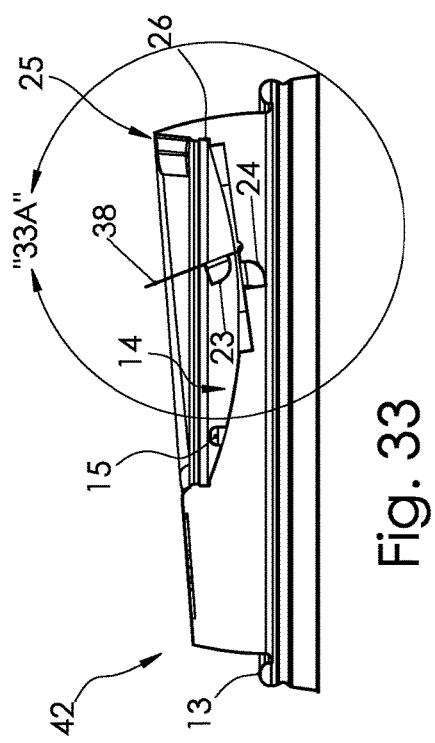
FIG. 33 is a medial type cross-sectional view of the fourth lower lid body according to the present invention as sectioned from a lateral view to show in greater detail structures otherwise obscured by lateral portions of the fourth lower lid body.
Figure 37:
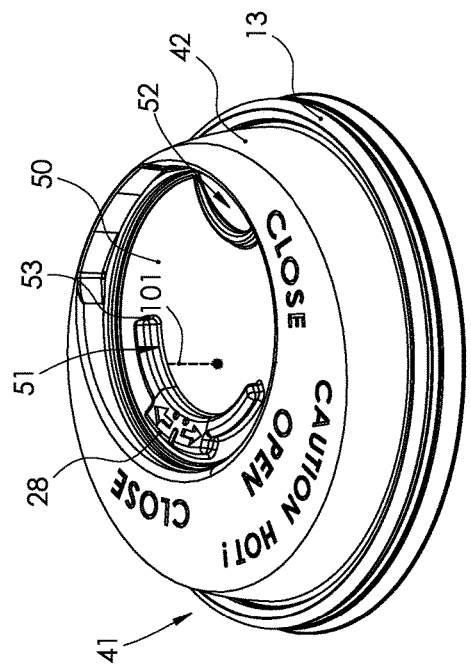
FIG. 37 is a top posterior perspective view of a fourth lid embodiment ensemble or lid assembly with the upper lid body insert and the fourth lower lid body according to the present invention in a first of four closed configurations.
Figure 39:
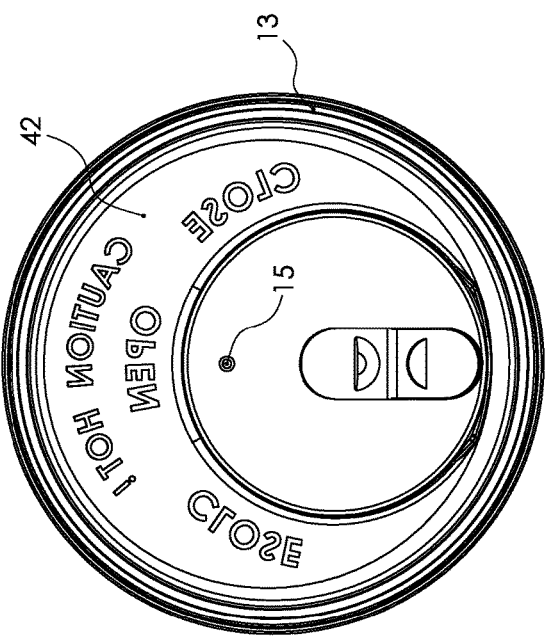
FIG. 39 is a bottom plan view of the fourth lid embodiment ensemble or lid assembly according to the present invention in a closed configuration.
Figure 38:
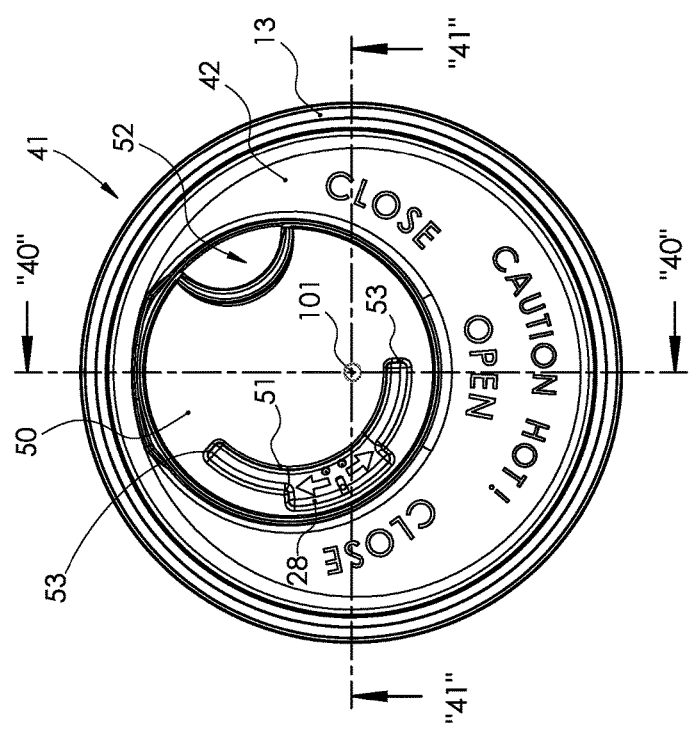
FIG. 38 is a top plan view of the fourth lid embodiment ensemble or lid assembly according to the present invention in the first of four closed configurations.
Figure 42:
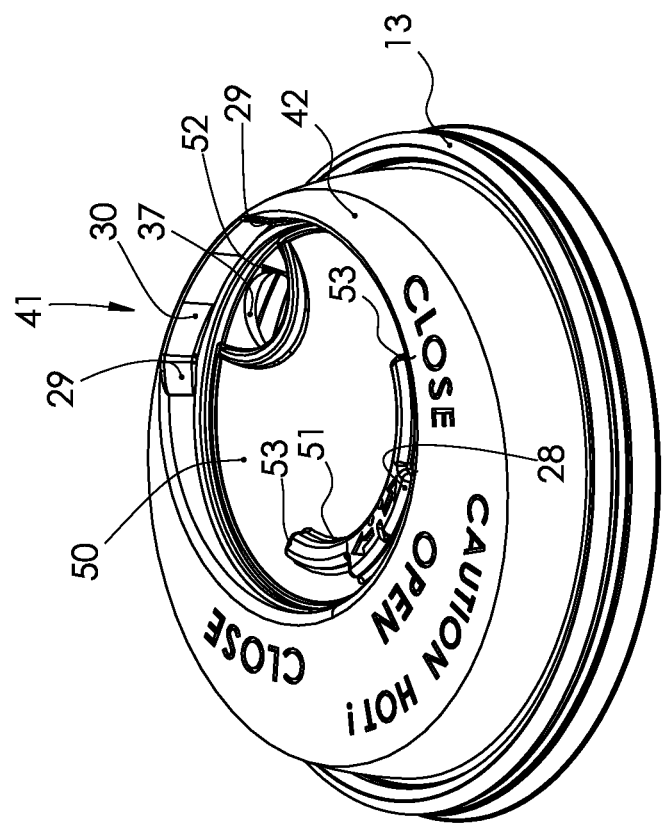
FIG. 42 is a top posterior perspective view of the fourth lid embodiment ensemble or lid assembly according to the present invention in a first of two open configurations.
Figure 43:
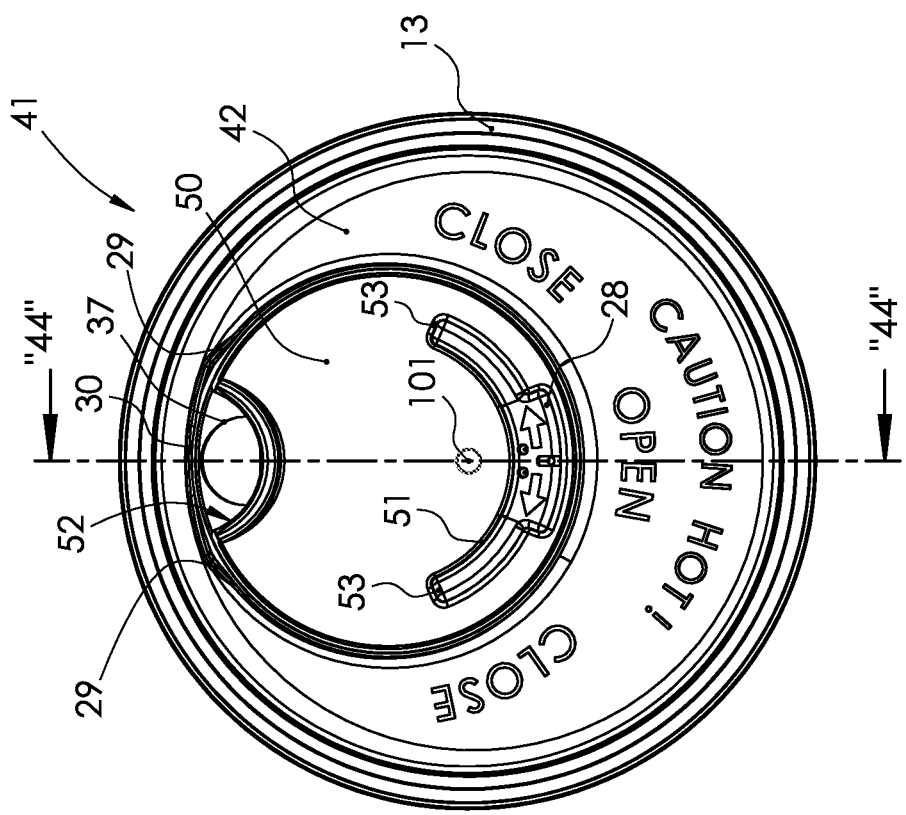
FIG. 43 is a top plan view of the fourth lid embodiment ensemble or lid assembly according to the present invention in the first of two open configurations.
Figure 45:
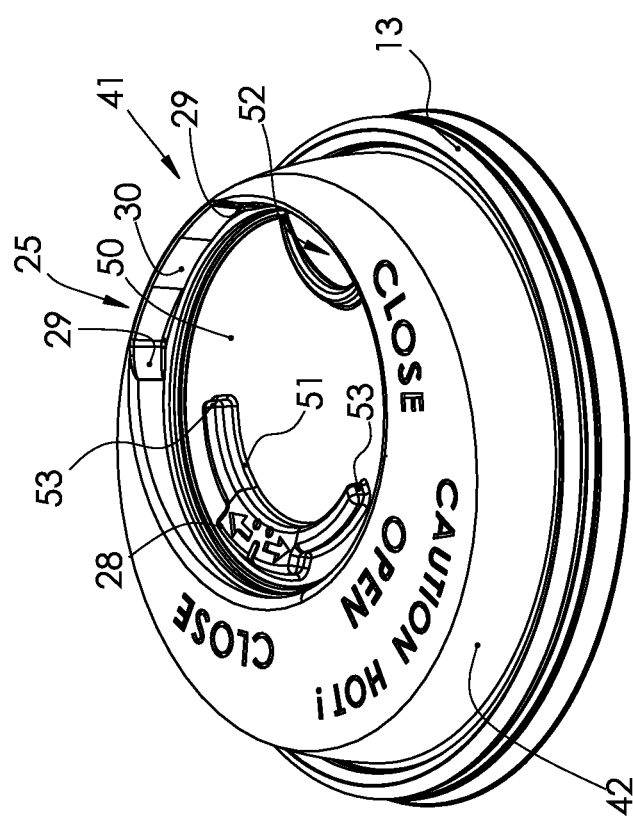
FIG. 45 is a top posterior perspective view of the fourth lid embodiment ensemble or lid assembly according to the present invention shown in a second of four closed configurations.
Figure 46:
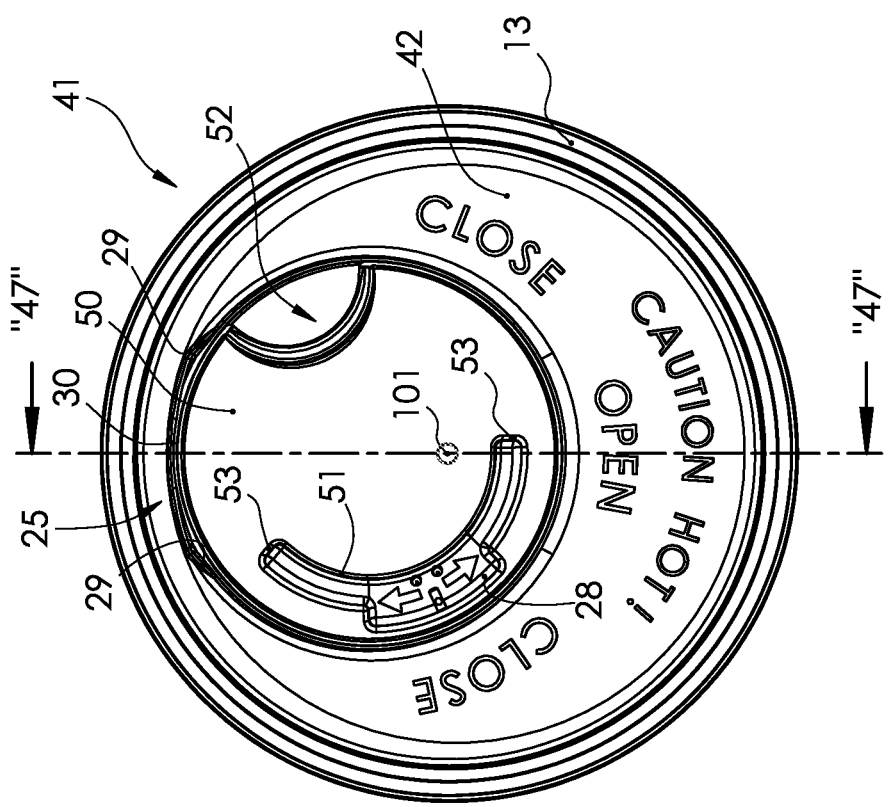
FIG. 46 is a top plan view of the fourth lid embodiment ensemble or lid assembly according to the present invention shown in the second of four closed configurations.
Figure 48:
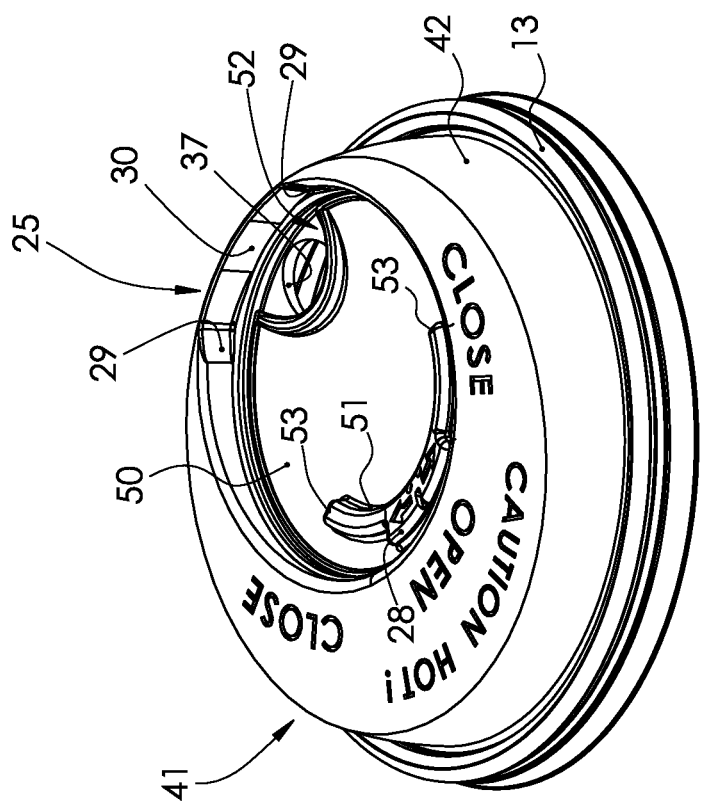
FIG. 48 is a top posterior perspective view of a fourth lid embodiment ensemble or lid assembly according to the present invention in a second of two open configurations.
Figure 49:
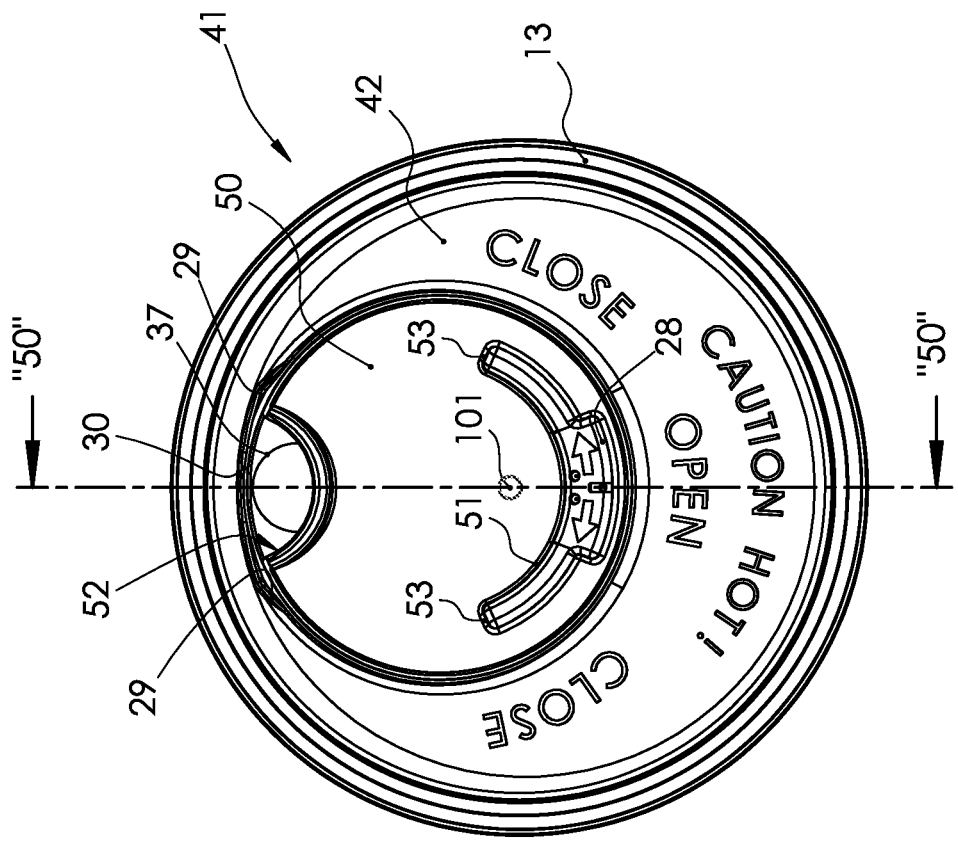
FIG. 49 is a top plan view of the fourth lid embodiment ensemble or lid assembly according to the present invention in the second of two open configurations.
Figure 50:
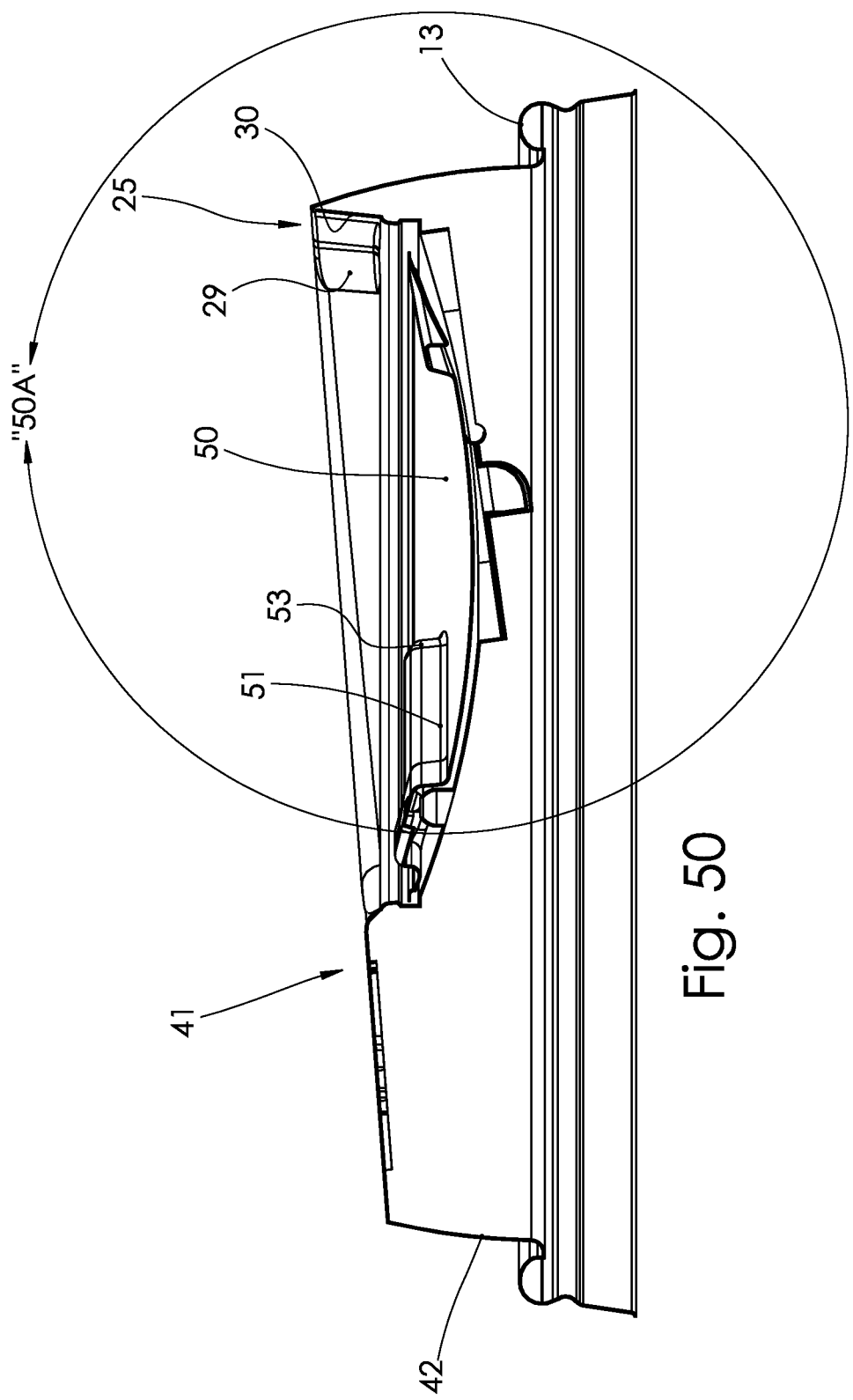
FIG. 50 is an enlarged medial type cross-sectional view of the fourth lid embodiment ensemble or lid assembly according to the present invention as sectioned from FIG. 49 from a lateral view to show in greater detail structures otherwise obscured by lateral portions of the fourth lower lid body in the second of two open configurations.
Figure 59:
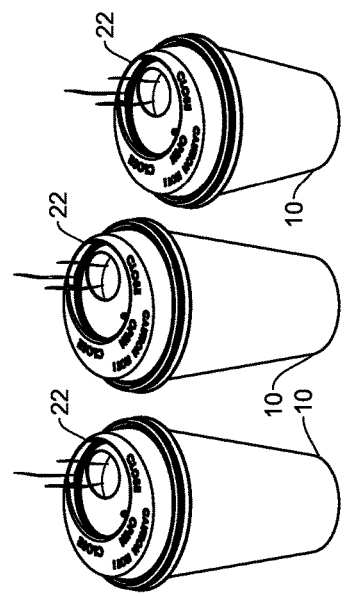
FIG. 59 is a perspective view of a series of second lower lid bodies according to the present invention in assembled relation with two tall containers and a short container in a second condition of use.

Referring now to the drawings with more specificity, the preferred embodiments of the present invention primarily concern lid assemblies as variously exemplified as at lid assemblies 11, 21, 31, and 41 for outfitting a liquid container as at 10. The lid assemblies 11, 21, 31, and 41 each preferably comprise, in combination, a lower lid body as respectively referenced at 12, 22, 32, and 42; and an upper lid body insert as at 50. The lower lid bodies 12, 22, 32, and 42 each preferably comprise a lower rim-receiving groove as at 13, an upper insert-receiving depression as at 14, an upwardly extending channel-guiding protuberance as at 15, and a lid body axis as at 101. The rim-receiving groove 13 generally extends in a groove plane radially equidistant from the lid body axis 101.

The upper insert-receiving depression 14 further preferably comprises a depression axis as at 103. The lid body axis 101 and the depression axis 103 are preferably parallel to one another such that the upper insert-receiving depression 14 is off-centered relative to the rim-receiving groove 13. The channel-guiding protuberance 15 is preferably formed at an upper surface 16 of the upper insert-receiving depression 14, which insert-receiving depression 14 is further preferably outfitted with a primary liquid outlet as respectively referenced at 17, 27, and 37 for enabling liquid egression therethrough. The lower rim-receiving groove 13 primarily functions to attach the lower lid bodies 12, 22, 32, and 42 to an upper container rim 19 of a liquid container as at 10. Primary liquid outlets 17, 27, and 37 structurally differ from one another primarily in terms of the size and shape of the liquid-letting aperture formed therein.

In this last regard, the primary liquid outlets 17 and 27 structurally differentiate lower lid body 12 from lower lid body 22. In other words, but for the size and shape of primary liquid outlets 17 and 27, all other features of the lower lid bodies 12 and 22 are substantially similar. In addition to a differing size and shape, primary liquid outlet 37 differs from primary liquid outlets 17 and 27 in that the primary liquid outlet 37 may be preferably outfitted with either an outlet cover as at 18 or an outlet cover as at 38. The primary liquid outlet 37 of the lower lid body 32 is preferably outfitted with outlet cover 18 and the primary liquid outlet 37 of the lower lid body 42 is preferably outfitted with outlet cover 38. The outlet covers 18 and 38 selectively prevent liquid egression through the primary liquid outlet 37.

The outlet cover 38 may preferably comprise an upwardly extending protuberance or knob 23 for enabling a user to manually grab and maneuver the outlet cover 38 from an outlet-covering position as generally depicted in FIGS. 28-30A to an outlet-opening position as generally depicted in FIGS. 31-36A. The upper insert-receiving depression 14 may preferably comprise a protuberance-receiving depression 24 for receiving and retaining the upwardly extending protuberance or knob 23 when the outlet cover 38 is in a fully open, outlet-opening position as generally depicted in FIGS. 34-36A, 47, 47A, 50, and 50A. Outlet cover 18 is planar in form and has no upwardly extending protuberance or knob 23.

The upper lid body insert 50 is sized and shaped for receipt in the upper insert-receiving depression 14. In this regard, the lower lid bodies 12, 22, 32, and 42 each preferably further comprise an insert edge-receiving track 26 and the upper lid body insert 50 comprises an outer insert edge 57. The insert edge-receiving track 26 receives and guides the outer insert edge 57 when the upper lid body insert 50 is received in the insert-receiving depression 14. The insert edge-receiving track 26 thereby enhances rotation of the lid body insert 50 relative to the lower lid bodies 12, 22, 32, and 42, and further prevents inadvertent removal of the lid body insert 50 from the lower lid bodies 12, 22, 32, and 42.

The lid body insert 50 further preferably comprises a protuberance-receiving channel or groove as at 51, a secondary liquid outlet as at 52, an insert axis as at 102, and an insert radius of curvature as at 105. The insert axis 102 becomes collinear with depression axis 103 and the protuberance-receiving channel 51 receives the channel-guiding protuberance 15 when the upper lid body insert 50 is received in the upper insert-receiving depression 14. The upper lid body insert 50 is rotatable about the insert and depression axes 102/103 intermediate first and second closed lid positions with a fully open position equidistant between the first and second closed lid positions. The fully open position of the lid body insert 50 is depicted in FIGS. 7-9, 19-21, 42, 43, 48, 49, and 62. A first closed position of the lid body insert 50 is depicted in FIGS. 37, 38, 45, 46, and 65.

The protuberance-receiving channel 51 preferably comprises opposed terminal ends as at 53. The opposed terminal ends 53 primarily function to engage the channel-guiding protuberance 15 and prevent further rotation of the upper lid body insert 50 relative to the lower lid bodies 12, 22, 32, and 42 at the first and second closed lid body insert positions. The secondary liquid outlet 52 is positionable in superior adjacency to the primary liquid outlets 17, 27, and 37 when in the open lid position intermediate the first and second closed lid body insert positions for enabling liquid egress via both the primary and secondary liquid outlets 17 and 52. The secondary liquid outlet 52 is further rotatably positionable in lateral adjacency to the primary liquid outlets 17, 27, and 37 when in the first and second closed lid body insert positions for preventing liquid egress via the lid assemblies 11, 21, 31, and 41.

The lower lid bodies 12, 22, 32, and 42 may further preferably comprise a liquid spillway 25 in anterior adjacency to the primary liquid outlets 17, 27, and 37 for enhancing liquid transfer from the lid-outfitted liquid container and particularly for enhancing liquid delivery for consumption. The liquid spillway 25 may preferably be characterized by comprising an arcuate central portion 30 and laterally opposed guideways 29, which laterally opposed guideways 29 preferably extend obliquely relative to the arcuate central portion 30 for guiding egressing liquid toward the arcuate central portion 30 thereby enhancing liquid migration over the liquid spillway 25.

The protuberance-receiving channel 51 preferably comprises an arc length intermediate the opposed terminal ends 53, which arc length has a channel radius of curvature 104 lesser in magnitude relative to the insert radius of curvature 105 and is dimensioned so as to position the secondary liquid outlet 52 in lateral adjacency to the liquid spillway 25 when in a select closed lid body insert position. In this regard, a select terminal end 53 may be positioned in lateral adjacency to the liquid spillway 25 when in the select closed lid body insert position. The select terminal end 53 and the secondary liquid outlet 52 thereby preferably flank the liquid spillway 25 when in the select closed lid body insert position as generally depicted in FIGS. 37, 38, 45, and 46.

The lid body insert 50 may further preferably comprise an upwardly extending knob formation 28, which knob formation 28 may preferably be formed so as to be coextensive with the protuberance-receiving channel 51 at an upper surface of the lid body insert 50 for enhancing a user's ability to grab and rotate the upper lid body insert 50 relative to the lower lid bodies 12, 22, 32, and 42 intermediate the fully open lid body insert position and the first and second fully closed lid body insert positions. It should be noted that the upper lid body insert 50 may be rotated so as to partially cover the primary liquid outlets 17, 27, and 37 at the secondary liquid outlet 52 in partially open lid positions (not specifically illustrated). The upper lid body insert 50 may thereby divert liquid egressing through the primary liquid outlets 17, 27, and 37 toward the secondary liquid outlet 52 for delaying liquid delivery and enhancing heat transfer therefrom prior to liquid egression via the secondary liquid outlet 52.

The insert-receiving depression 14 comprises an upper depression surface as at 33 and the upper lid body insert 50 comprises a lower insert surface as at 34. The upper depression surface 33 is preferably concave relative to the upper lid body insert 50 and the lower insert surface 34 is preferably convex relative to the insert-receiving depression 14. Together, the upper depression surface 33 and the lower insert surface 34 define an arcuate volume for receiving and pooling residual liquid therebetween. Heat from the pooled or residual liquid trapped within this arcuate volume quickly dissipates, and when mixed with relatively heated liquid lowers the overall temperature of liquid exiting the primary and secondary liquid outlets so as to minimize the potential for damage to human tissue during liquid consumption.

The present invention further contemplates a container lid assembly system for providing users of the lid assemblies with certain means for more easily assembling the lid assemblies. The lid assembly system according to the present invention incorporates the use of a lid insert stacking apparatus 35 as generally depicted in FIG. 60. The lid insert stacking apparatus 35 preferably comprises a cradle wall 36 and a base portion 37. The cradle wall 36 is preferably arcuate in first and second cradle dimensions as respectively depicted at 111 and 112 and extends elongate in a third cradle dimension as at 113. More particularly, the cradle wall 36 is preferably semicircular in the first and second cradle dimensions 111/112 for maximizing both anterior access to a stacked column 44 of lid body inserts 50, and edge-alignment contact with the outer insert edges 57 of stacked lid body inserts 50. In this regard, at least two lid body inserts 50 are stackable inwardly of the cradle wall 36 and each comprise outer insert edging or edges 57.

The cradle wall 36 is dimensioned for engaging the outer insert edging or edges 57 of the lid body inserts 50 for aligning the inserts 50 into a stacked column 44 extending in the third cradle dimension 113. The lid insert stacking apparatus 35 may further preferably comprise an outlet alignment hub as at 58. The outlet alignment hub 58 is preferably arcuate in the first and second cradle dimensions 111/112 and also extends elongate in the third cradle dimension 113. The outlet alignment hub 58 provides a fixed structure insertable into the secondary liquid outlets 52 of the at least two lid body inserts 50 of the stacked column 44 for enhancing alignment of the at least two lid body inserts 50 as stacked within the stacked column 44.

Figures 63, 64, 65:
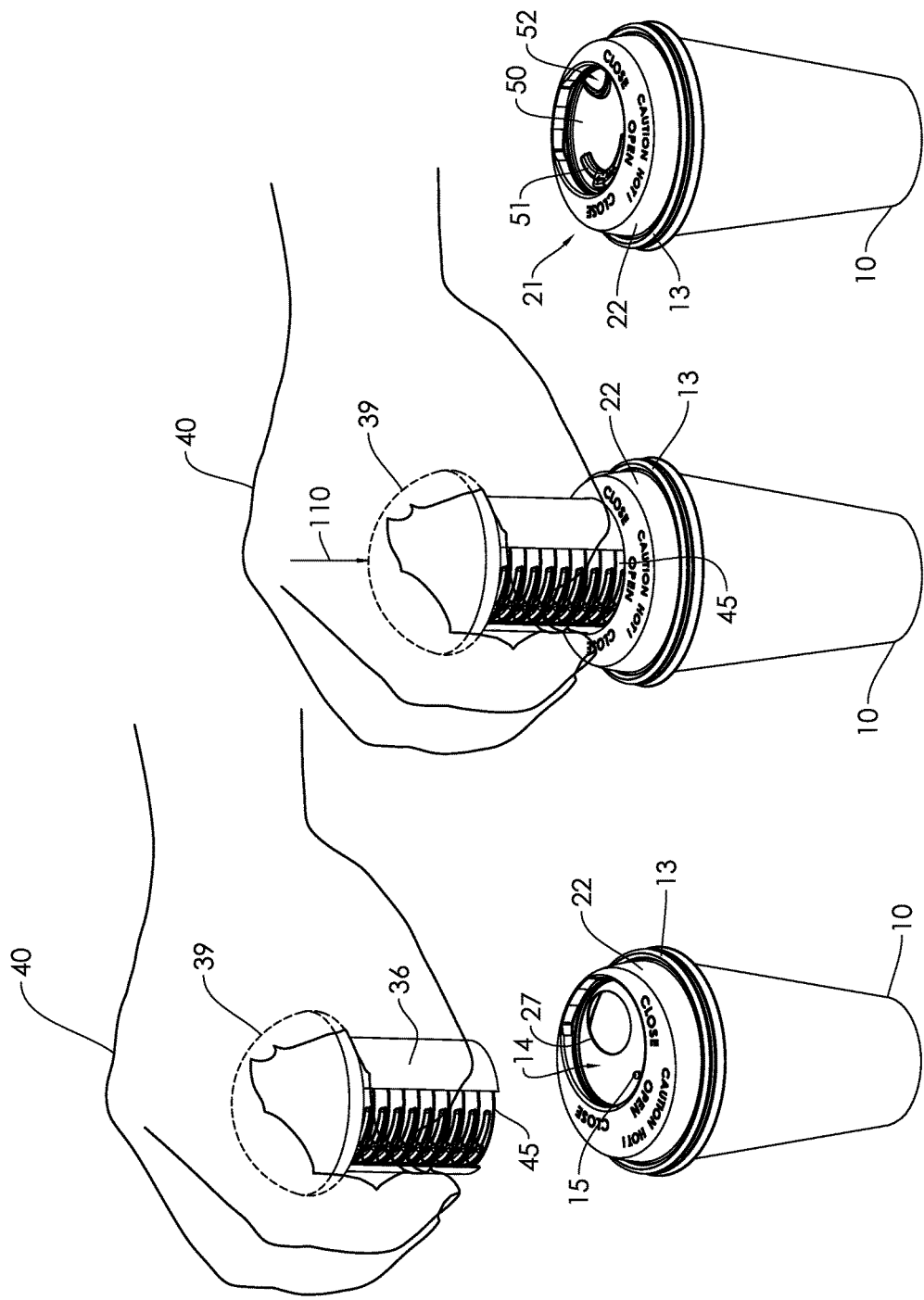
FIG. 63 is a first sequential perspective depiction of a user holding a stacked column of upper lid body inserts before inserting a lowermost lid body insert from the stacked column into a second lower lid body as assembled atop a tall container via a press mechanism outfitted upon a cradle wall of the insert stacking apparatus.
FIG. 64 is a second sequential perspective depiction of a user holding a stacked column of upper lid body inserts while inserting a lowermost lid body insert from the stacked column into a second lower lid body as assembled atop a tall container.
FIG. 65 is a third sequential perspective depiction of the second lid embodiment ensemble or lid assembly as fully assembled atop a tall container.

The insert stacking apparatus 35 may further preferably comprise a press mechanism as generally depicted and referenced at 39 in FIGS. 63 and 64. The press mechanism 39 is cooperatively associated with or outfitted upon the cradle wall 36 at an upper end thereof and interfaces intermediate a user's hand 40 and an uppermost lid body insert 43 for directing and/or transferring a force 110 into the stacked column 44 for disengaging a lowermost lid body insert 45 from a lower end of the stacked column 44.

Recalling that the lower lid bodies 12, 22, 32, and 42 each preferably comprise an upper insert-receiving depression 14, the lowermost lid body insert 45 is receivable in the upper insert-receiving depression 14 of a targeted lower lid body when disengaged from the lower end of the stacked column 44 as generally and comparatively depicted in FIGS. 63-65. Further recalling that each lid body insert 50 comprises a protuberance-receiving channel as at 51, and that a channel-guiding protuberance 15 is preferably formed at the upper depression surface 33 of the insert-receiving depression 14, the channel-guiding protuberance 15 is receivable in the protuberance-receiving channel 51 of the lowermost lid body insert 45 when disengaged from the lower end of the stacked column 44.

It is contemplated that the lid insert stacking apparatus 35 as depicted in FIG. 60 is designed particularly for consumers such that the consumer may retrieve a lid body insert 50 from the stacked column 44 and insert by hand the lid body insert 50 retrieved from the stacked column one at the time. In other words, a consumer may take one lid body insert 50 and press it into an insert-receiving depression 14 by hand. Referencing FIGS. 63-64, and the cradle wall 36 with press mechanism 39, it is further contemplated that the apparatus there illustrated is designed primarily for the attendant in the store at the time of customer service, and may press by hand a lowermost lid body insert 50 into an insert-receiving depression 14 of the targeted lower lid body.

In view of the foregoing specifications, the present invention further contemplates a container lid assembly method essentially comprising a series of steps, including an initial step of inserting a first lid body insert 50 into a lid insert stacking apparatus 35 substantially as previously described. The outlet alignment hub 58 may be inserted into the secondary liquid outlet 52 of the firstly inserted lid body insert 50. A second and successive lid body inserts 50 may then be inserted into the lid insert stacking apparatus 35 whereafter at least the first and second lid body inserts 50 may be stacked inwardly of the cradle wall 36 into a stacked column 44 of lid body inserts 50. Outer insert edging 57 of the first and second (and successive) lid body inserts 50 may engage the cradle wall 36 for enhancing alignment of the first and second (and successive) lid body inserts 50 in the stacked column 44 of lid body inserts 50. The outlet alignment hub 58 is insertable into liquid outlets 52 of the second and successively received lid body inserts 50 for enhancing alignment of the lid body inserts 50 as stacked within the stacked column 44.

Recalling that the cradle wall 36 is preferably semicircular in the first and second cradle dimensions 111/112, the lid stacking apparatus 35 provides an anterior access opening 46 to the cradle wall 36. The first and second and successive lid body inserts 50 may be inserted into the lid insert stacking apparatus 35 via the anterior access opening 46. The cradle wall 36 may be outfitted with the press mechanism 39 at an upper end of the cradle wall 36 interfacing intermediate a user's hand 40 and an uppermost lid body insert 43. The lid assembly method may then further comprise the step of transferring a force as at vector 110 into the stacked column 44 for disengaging a lowermost lid body insert 45 from a lower end of the stacked column 44.

The lower lid bodies 12, 22, 32, and 42, comprising an upper insert-receiving depression 14, may respectively receive the lowermost lid body insert 45 in the upper insert-receiving depression 14 when said insert 45 is disengaged from the lower end of the stacked column 44. The stacked lid body inserts 50 each comprise a protuberance-receiving channel 51 and the insert-receiving depression 14 comprises a channel-guiding protuberance 15. The channel-guiding protuberance 15 is received in the protuberance-receiving channel 51 of the lowermost lid body insert 45 when disengaged from the lower end of the stacked column 44 and received by the insert-receiving depression 14, the outer insert edging 57 being further received in the insert edge-receiving track 26 of the lower lid bodies 12, 22, 32, and 42 as the case may be.

Referencing FIGS. 1-12A, the reader will there consider a first embodiment of the lid assembly 11 according to the present invention. A key feature of the first embodiment is that the primary liquid outlet or opening 17 is significantly bigger, oval shaped, and placed in a frontal or anterior position. The primary benefit of this primary liquid outlet or opening 17 is to significantly increase liquid flow if desired. This embodiment is a prelude for successive embodiments with significantly bigger outlets as at 27 and 37.

Figure 58:
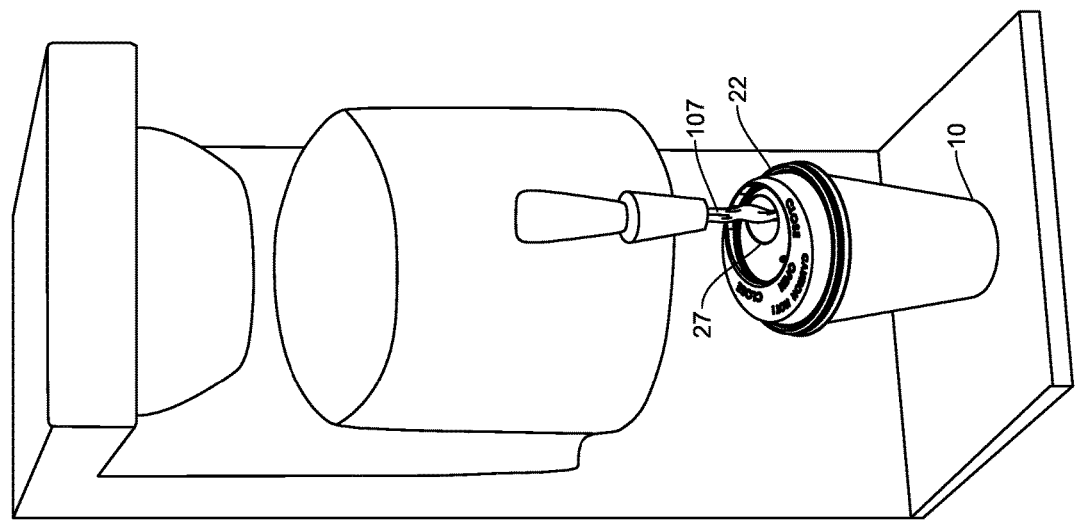
FIG. 58 is a perspective view of the second lower lid body according to the present invention in assembled relation with a tall container in a first condition of use.

Referencing FIGS. 13-24, the reader will there consider the second embodiment or lid assembly 21. Embodiment or lid assembly 21 provides a significantly bigger primary liquid outlet 27 making it possible to fill a liquid container 10 with liquid 107 via the lower lid body 22 as attached to the liquid container 10 or cup as otherwise generally depicted in FIG. 58. After the liquid container 10 is filled with liquid 107 via the lower lid body 22, the upper lid body insert 50 or disc may be inserted into the lower lid body 22 if needed or desired. This allows the manufacturer to send the upper lid body insert 50 and the lower lid bodies 22 separately to beverage establishments without assembly, which lowers the cost of manufacturing. Further, this provides users with an ability to significantly improve safety, effectiveness and choices of use of hot beverage service to customers as generally and comparatively depicted in FIGS. 56-65.

Referencing FIGS. 25 through 27A and FIGS. 28 through 50B, respectively, the reader will there consider third and fourth embodiments or lid assemblies 31, and 41. These embodiments or lid assemblies 31/41 incorporate a flip-flop type opening and closing element or outlet-covering, with a frontal depression and optional accommodation of the disk or upper lid body insert 50. These structural features also increase options for using the same elements as generally depicted in FIGS. 26-50. Particular attention is directed to the fourth embodiment or lid assembly 41, as opposed to lid assembly 31, the latter of which basically shows or supports the generic or general concept.

Referencing FIGS. 28-36A, the reader will there consider the simple flip-flop, open and close abilities of the aperture or outlet cover 38 with a locking mechanism incorporating elements 23 and 24. This embodiment provides a common structural concept of a big opening, with a flip-fop open/close mechanism with a "liquid edge overflow" or liquid spillway 25 feature. Together these features significantly reduce the chances of spillage. Referencing FIGS. 37-44A, the reader will there consider embodiment or lid assembly 41 in configurations whereby the upper lid body insert 50 or disc is placed over the "flip-flop" mechanism and pushes the outlet cover 38 downwardly via the knob element 23 to keep the outlet cover 38 in a relatively open position.

The opening and closing of the flip-flop type outlet cover 38 is regulated by positioning the upper lid body insert 50 or disk in various positions of rotation relative to the lower lid body 42. This structural combination provides the user with options for inserting the upper lid body insert 50 or disk by a server or customer if desired. Referencing FIGS. 45-50B, the reader will there consider certain alternative configurations. The reader will note that the disk or upper lid body insert 50 is positioned over the "flip-flop" mechanism or outlet cover 38 when in a retained open position.

This provides a structural option of greater liquid flow with the lid body insert 50 being used to control open/close states as optionally insertable into the lower lid body 42 by the server or customer. FIGS. 51-55A depict the upper lid body insert 50 or disk in varying forms. The stopper mechanism or protuberance-receiving channel 51 is essentially a movement-limiting mechanism and can be formed in any number of different ways. Referencing FIGS. 56-65 the reader will there consider a process of market adaptation of the embodiment or lid assembly 21 incorporating the use of the insert stacking apparatus 35 with press mechanism 39 substantially as described herein above.

While the above descriptions contain much specificity, this specificity should not be construed as limitations on the scope of the invention, but rather as an exemplification of the invention. In certain embodiments, the basic invention may be said to essentially teach or disclose a lid assembly for attachment to a liquid container or for otherwise outfitting a liquid container along with an insert stacking apparatus for aiding in lid assembly and certain associated methods. The lid assembly according to the present invention may be said to essentially comprise a lower lid body and an upper lid body insert.

The lid body according to the present invention preferably comprises a rim-receiving groove, an insert-receiving depression, and a channel-guiding protuberance. The channel-guiding protuberance is formed at an upper depression surface of the insert-receiving depression. The insert-receiving depression is outfitted with a primary liquid outlet for enabling liquid egression therethrough. The rim-receiving groove attaches the lid body to a container rim of a liquid container.

The lid body insert according to the present invention is receivable in the insert-receiving depression and comprises a protuberance-receiving channel, a secondary liquid outlet, an insert axis, and an insert radius of curvature. The protuberance-receiving channel receives the channel-guiding protuberance when the lid body insert is received in the insert-receiving depression. The lid body insert is rotatable about the insert axis intermediate first and second closed lid body insert positions.

The protuberance-receiving channel comprises opposed terminal ends, which opposed terminal ends engage the channel-guiding protuberance and prevent rotation of the lid body insert relative to the lid body at the first and second closed lid body insert positions. The secondary liquid outlet is positionable in superior adjacency to the primary liquid outlet when in an open lid body insert position intermediate the first and second closed lid body insert positions for enabling liquid egression via both the primary and secondary liquid outlets. The secondary liquid outlet is positionable in lateral adjacency to the primary liquid outlet when in the first and second closed lid body insert positions for preventing liquid egression via the lid assembly.

Other preferred options for the lid assembly according to the present invention include an off-centered insert-receiving depression relative to the rim-receiving groove of the lid body. In other words, the rim-receiving groove extends radially equidistant from a lid body axis and the insert-receiving depression comprises a depression axis. The lid body axis and the depression axis are parallel to one another such that the insert-receiving depression is off-centered relative to the rim-receiving groove generally defining the outer extent of the lid body.

The lid body may preferably comprise an insert edge-receiving track and the lid body insert may preferably comprises an outer insert edge. The insert edge-receiving track receives the outer insert edge when the lid body insert is received in the insert-receiving depression. The insert edge-receiving track enhances rotation of the lid body insert relative to the lid body and prevents inadvertent removal of the lid body insert from the lid body.

Further, the primary liquid outlet may preferably comprise an outlet cover in certain embodiments, which outlet cover selectively prevents liquid egression through the primary liquid outlet. The outlet cover may preferably comprise an upwardly extending knob or protuberance. The upwardly extending knob enables a user to more easily manually grab and maneuver the outlet cover from an outlet-covering position to an outlet-opening position. The insert-receiving depression may preferably comprise a protuberance-receiving depression for receiving and retaining the upwardly extending knob when the outlet cover is in a select outlet-opening position.

The lid body may preferably comprise a liquid spillway in anterior adjacency to the primary liquid outlet for enhancing liquid delivery. The liquid spillway may preferably be characterized by comprising an arcuate central portion and laterally opposed guideways. The laterally opposed guideways extend obliquely relative to the arcuate central portion for enhancing liquid migration over the liquid spillway.

The protuberance-receiving channel may preferably comprise an arc length intermediate the opposed terminal ends having a channel radius of curvature lesser in magnitude relative to the insert radius of curvature and is dimensioned in length so as to position the secondary liquid outlet in lateral adjacency to the liquid spillway when in a select closed lid body insert position. A select terminal end may be further positioned in lateral adjacency to the liquid spillway when in the select closed lid body insert position. The select terminal end and the secondary liquid outlet thereby flank the liquid spillway when in the select closed lid body insert position.

The container lid assembly system according to the present invention may be said to essentially comprise, in combination a lid insert stacking apparatus and at least two lid body inserts. The lid insert stacking apparatus preferably comprises a cradle wall and a base portion. The cradle wall is preferably arcuate in first and second cradle dimensions and extends elongate in a third cradle dimension. The lid body inserts are stackable inwardly of the cradle wall, each comprising an outer insert edge. The cradle wall engages the outer insert edges of the lid body inserts for aligning the lid body inserts into a stacked column of lid body inserts extending in the third cradle dimension.

The lid insert stacking apparatus may further preferably comprise an outlet alignment hub. The outlet alignment hub is preferably arcuate in the first and second cradle dimensions and extends in the third cradle dimension. The outlet alignment hub is insertable into the secondary liquid outlets of the lid body inserts for enhancing alignment of the lid body inserts as stacked within the stacked column of lid body inserts. The cradle wall is preferably semicircular in the first and second cradle dimensions for enhancing/maximizing anterior access to the stacked column of lid body inserts while maximizing alignment contact with the stacked column of lid body inserts.

The cradle wall may be preferably outfitted with a press mechanism at an upper end of the cradle wall. The press mechanism interfaces intermediate a user's hand and an uppermost lid body insert for transferring a force into the stacked column for disengaging a lowermost lid body insert from a lower end of the stacked column. Noting that the lid bodies according to the present invention each comprise an insert-receiving depression, the lowermost lid body insert is receivable in the insert-receiving depression of a targeted lower lid body when disengaged from the lower end of the stacked column.

The contemplated container lid assembly method according to the present invention may be said to comprise the steps of inserting a first and a second lid body insert into a lid insert stacking apparatus, and stacking the first and second lid body inserts inwardly of the cradle wall into a stacked column of lid body inserts. Outer insert edging of the first and second body inserts may engage the cradle wall for aligning the first and second lid body inserts in the stacked column of lid body inserts. The outlet alignment hub of the insert stacking apparatus is insertable into liquid outlets of the first and second lid body inserts for enhancing alignment of the first and second lid body inserts as stacked within the stacked column.

The cradle wall of the insert stacking apparatus is preferably semicircular in the first and second cradle dimensions thereby providing an anterior access opening to the cradle wall. The first and second and successive lid body inserts may thus be inserted into the lid insert stacking apparatus via the anterior access opening. The cradle wall, being further outfitted with a press mechanism at an upper end of the cradle wall, interfaces intermediate a user's hand and an uppermost lid body insert. The method may be said to further comprise the steps of transferring a force into the stacked column for disengaging a lowermost lid body insert from a lower end of the stacked column, and receiving the lowermost lid body insert in an insert-receiving depression of a lid body when disengaged from the lower end of the stacked column.

Accordingly, although the invention has been described by reference to certain preferred embodiments, certain systemic components, and certain associated methodologies, it is not intended that the novel arrangement and methods be limited thereby, but that modifications thereof are intended to be included as falling within the broad scope and spirit of the foregoing disclosures and the appended drawings.

What is claimed is:

1. A lid assembly for outfitting a liquid container, the lid assembly comprising, in combination:
   a lid body, the lid body comprising a rim-receiving groove, an insert-receiving depression, and a channel-guiding protuberance, the channel-guiding protuberance being formed at an upper depression surface of the insert-receiving depression, the insert-receiving depression being outfitted with a primary liquid outlet for enabling liquid egression therethrough, the rim-receiving groove for attaching the lid body to a container rim of the liquid container; and
   a lid body insert, the lid body insert being receivable in the insert-receiving depression and comprising a protuberance-receiving channel, a secondary liquid outlet, an insert axis, and an insert radius of curvature, the protuberance-receiving channel receiving the channel-guiding protuberance when the lid body insert is received in the insert-receiving depression, the lid body insert being rotatable about the insert axis intermediate first and second closed lid body insert positions, the protuberance-receiving channel comprising opposed terminal ends, the opposed terminal ends for engaging the channel-guiding protuberance and preventing rotation of the lid body insert relative to the lid body at the first and second closed lid body insert positions, the secondary liquid outlet being rotatably positionable in superior adjacency to the primary liquid outlet when in an open lid body insert position intermediate the first and second closed lid body insert positions for enabling liquid egression via both the primary and secondary liquid outlets, the secondary liquid outlet being rotatably positionable in lateral adjacency to the primary liquid outlet when in the first and second closed lid body insert positions for preventing liquid egression via the lid assembly.

2. The lid assembly of claim 1 wherein the rim-receiving groove extends radially equidistant from a lid body axis and the insert-receiving depression comprises a depression axis, the lid body axis and the depression axis being parallel to one another such that the insert-receiving depression is off-centered relative to the rim-receiving groove.

3. The lid assembly of claim 1 wherein the primary liquid outlet comprises an outlet cover, the outlet cover for selectively preventing liquid egression therethrough.

4. The lid assembly of claim 3 wherein the outlet cover comprises an upwardly extending knob, the upwardly extending knob for enabling a user to manually grab and maneuver the outlet cover from an outlet-covering position to an outlet-opening position.

5. The lid assembly of claim 4 wherein the insert-receiving depression comprises a protuberance-receiving depression, the protuberance-receiving depression for receiving and retaining the upwardly extending knob when the outlet cover is in a select outlet-opening position.

6. The lid assembly of claim 1 wherein the lid body comprises a liquid spillway in anterior adjacency to the primary liquid outlet, the liquid spillway for enhancing liquid delivery.

7. The lid assembly of claim 6 wherein the protuberance-receiving channel comprises an arc length intermediate the opposed terminal ends, the arc length having a channel radius of curvature lesser in magnitude relative to the insert radius of curvature and being dimensioned so as to position the secondary liquid outlet in lateral adjacency to the liquid spillway when in a select closed lid body insert position.

8. The lid assembly of claim 7 wherein a select terminal end is positioned in lateral adjacency to the liquid spillway when in the select closed lid body insert position, the select terminal end and the secondary liquid outlet thereby flanking the liquid spillway when in the select closed lid body insert position.

9. The lid assembly of claim 8 wherein the liquid spillway is characterized by comprising an arcuate central portion and laterally opposed guideways, the laterally opposed guideways extending obliquely relative to the arcuate central portion for enhancing liquid migration over the liquid spillway.

10. The lid assembly of claim 1 wherein the lid body comprises an insert edge-receiving track and the lid body insert comprises an outer insert edge, the insert edge-receiving track receiving the outer insert edge when the lid body insert is received in the insert-receiving depression, the insert edge-receiving track for enhancing rotation of the lid body insert relative to the lid body and preventing inadvertent removal of the lid body insert from the lid body.

11. A lid assembly for outfitting a liquid container, the lid assembly comprising, in combination:

a lid body, the lid body comprising an insert-receiving depression, and a channel-guiding protuberance, the channel-guiding protuberance being formed at an upper depression surface of the insert-receiving depression, the insert-receiving depression being outfitted with a primary liquid outlet for enabling liquid egression therethrough, the lid body being attachable to the liquid container; and a lid body insert, the lid body insert being receivable in the insert-receiving depression and comprising a protuberance-receiving channel, a secondary liquid outlet, an insert axis, and an insert radius of curvature, the protuberance-receiving channel receiving the channel-guiding protuberance when the lid body insert is received in the insert-receiving depression, the lid body insert being rotatable about the insert axis intermediate first and second closed lid body insert positions, the protuberance-receiving channel comprising opposed terminal ends, the opposed terminal ends for engaging the channel-guiding protuberance and preventing rotation of the lid body insert relative to the lid body at the first and second closed lid body insert positions, the secondary liquid outlet being rotatably positionable in superior adjacency to the primary liquid outlet when in an open lid body insert position intermediate the first and second closed lid body insert positions for enabling liquid egression via both the primary and secondary liquid outlets, the secondary liquid outlet being rotatably positionable in lateral adjacency to the primary liquid outlet when in the first and second closed lid body insert positions for preventing liquid egression via the lid assembly.

12. The lid assembly of claim 11 wherein the lid body comprises a lid body axis and the insert-receiving depression comprises a depression axis, the lid body axis and the depression axis being parallel to one another such that the insert-receiving depression is off-centered relative to the lid body.

13. The lid assembly of claim 11 wherein the primary liquid outlet comprises an outlet cover, the outlet cover for selectively preventing liquid egression therethrough.

14. The lid assembly of claim 13 wherein the outlet cover comprises an upwardly extending knob, the upwardly extending knob for enabling a user to manually grab and maneuver the outlet cover from an outlet-covering position to an outlet-opening position.

15. The lid assembly of claim 14 wherein the insert-receiving depression comprises a protuberance-receiving depression, the protuberance-receiving depression for receiving and retaining the upwardly extending knob when the outlet cover is in a select outlet-opening position.

16. The lid assembly of claim 11 wherein the lid body comprises a liquid spillway in anterior adjacency to the primary liquid outlet, the liquid spillway for enhancing liquid delivery.

17. The lid assembly of claim 16 wherein the protuberance-receiving channel comprises an arc length intermediate the opposed terminal ends, the arc length having a channel radius of curvature lesser in magnitude relative to the insert radius of curvature and being dimensioned so as to position the secondary liquid outlet in lateral adjacency to the liquid spillway when in a select closed lid body insert position.

18. The lid assembly of claim 17 wherein a select terminal end is positioned in lateral adjacency to the liquid spillway when in the select closed lid body insert position, the select terminal end and the secondary liquid outlet thereby flanking the liquid spillway when in the select closed lid body insert position.

19. The lid assembly of claim 18 wherein the liquid spillway is characterized by comprising an arcuate central portion and laterally opposed guideways, the laterally opposed guideways extending obliquely relative to the arcuate central portion for enhancing liquid migration over the liquid spillway.

20. The lid assembly of claim 11 wherein the lid body comprises an insert edge-receiving track and the lid body insert comprises an outer insert edge, the insert edge-receiving track receiving the outer insert edge when the lid body insert is received in the insert-receiving depression, the insert edge-receiving track for enhancing rotation of the lid body insert relative to the lid body and preventing inadvertent removal of the lid body insert from the lid body.

* * * * *